US012592807B2

(12) United States Patent
Li et al.

(10) Patent No.: US 12,592,807 B2
(45) Date of Patent: Mar. 31, 2026

(54) MODEL TRAINING METHOD, CHANNEL ADJUSTMENT METHOD, ELECTRONIC DEVICE, AND COMPUTER READABLE STORAGE MEDIUM

(71) Applicant: ZTE CORPORATION, Shenzhen (CN)

(72) Inventors: Dexin Li, Shenzhen (CN); Qiaoyan Liu, Shenzhen (CN); Kai Mao, Shenzhen (CN); Jianguo Li, Shenzhen (CN); Wangwang Ji, Shenzhen (CN); Zepeng Ma, Shenzhen (CN); Ke Shi, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 302 days.

(21) Appl. No.: 18/282,817

(22) PCT Filed: Mar. 14, 2022

(86) PCT No.: PCT/CN2022/080689
§ 371 (c)(1),
(2) Date: Sep. 19, 2023

(87) PCT Pub. No.: WO2022/194099
PCT Pub. Date: Sep. 22, 2022

(65) Prior Publication Data
US 2024/0171359 A1 May 23, 2024

(30) Foreign Application Priority Data
Mar. 19, 2021 (CN) .......................... 202110299486.3

(51) Int. Cl.
*H04L 5/00* (2006.01)
*G06N 20/00* (2019.01)
*H04L 1/00* (2006.01)

(52) U.S. Cl.
CPC ............. *H04L 5/006* (2013.01); *G06N 20/00* (2019.01); *H04L 1/0004* (2013.01); *H04L 1/001* (2013.01); *H04L 1/0061* (2013.01)

(58) Field of Classification Search
CPC ....... H04L 5/006; H04L 1/0004; H04L 1/001; H04L 1/0061; H04L 1/0009; H04L 1/0015; H04L 1/0003; G06N 20/00
See application file for complete search history.

(56) References Cited

U.S. PATENT DOCUMENTS

2006/0034274 A1* 2/2006 Kakani .................. H04L 1/1671
                                                                    370/389
2016/0294529 A1* 10/2016 Cho ...................... H04L 5/0055
(Continued)

FOREIGN PATENT DOCUMENTS

EP          2959621 B1 * 8/2018 ........... H04L 1/0693

OTHER PUBLICATIONS

European Patent Office, Partial supplementary European search report dated Feb. 5, 2025, for corresponding EP application No. 22770454.1.
(Continued)

*Primary Examiner* — Abdullahi E Salad
(74) *Attorney, Agent, or Firm* — Li & Cai Intellectual Property (USA) Office

(57) ABSTRACT

The present application provides a model training method, a channel adjustment method, an electronic device, and a computer readable storage medium, the model training method includes: collecting historical samples, with the historical samples including first scheduling information and first information corresponding to a historical data transmission, the first information representing a result of cyclic redundancy check, and the first scheduling information including first intermediate variable information in an adap-
(Continued)

/ 100
Collect historical samples, with the historical samples including first scheduling information and first information corresponding to a historical data transmission, the first information representing a result of cyclic redundancy check, and the first scheduling information including first intermediate variable information in an adaptive modulation and coding process / 101
Perform model training according to the historical samples to obtain a first prediction model, and during the model training, the first scheduling information is used as an input of the first prediction model, the first information is converted into second information corresponding to the historical data transmission to be used as an output of the first prediction model, and the second information is used for representing a probability value of the result of the cyclic redundancy check tive modulation and coding process; and performing model training according to the historical samples to obtain a first prediction model, and during the model training, the first scheduling information is used as an input of the first prediction model, the first information is converted into second information corresponding to the historical data transmission to be used as an output of the first prediction model, and the second information represents a probability value of the result of the cyclic redundancy check.

20 Claims, 8 Drawing Sheets

(56) References Cited

U.S. PATENT DOCUMENTS

| | | | | |
|---|---|---|---|---|
| 2019/0260623 | A1* | 8/2019 | Li | H04L 27/2627 |
| 2020/0167227 | A1* | 5/2020 | Her | G06F 11/165 |
| 2021/0089870 | A1* | 3/2021 | Arik | G06V 10/82 |

OTHER PUBLICATIONS

Vidit Saxena, et al: "Deep Learning for Frame Error Probability Prediction in BICM-OFDM Systems", arxiv.org, Cornell University Library, 201 Olin Library Cornell University Ithaca, NY14853,Oct. 31, 2017 (Oct. 31, 2017), XP081297253.

European Patent Office, The extended European search report dated May 26, 2025, for corresponding EP application No. 22770454.1.

Daniels R C et al: "An online learning framework for link adaptation in wireless networks",Information Theory and Applications Workshop, 2009, IEEE, Piscataway, NJ, USA, Feb. 8, 2009 (Feb. 8, 2009), pp. 138-140, XP031606820.

Makridis Evagoras: "Reinforcement Learning for Link Adaptation in 5G-NR Networks",,Mar. 2, 2021 (Mar. 2, 2021), pp. 2-64, XP093095652,DOI: 10.13140/RG.2.2.34666.24005.

Saishankar Katri Pulliyakode et al: "Reinforcement learning techniques for Outer Loop Link Adaptation in 4G/5G systems",arxiv. org, Cornell University Library, 201 Olin Library Cornell University Ithaca, NY 14853,Aug. 3, 2017 (Aug. 3, 2017), XP080951203.

* cited by examiner

Figures 1, 2:
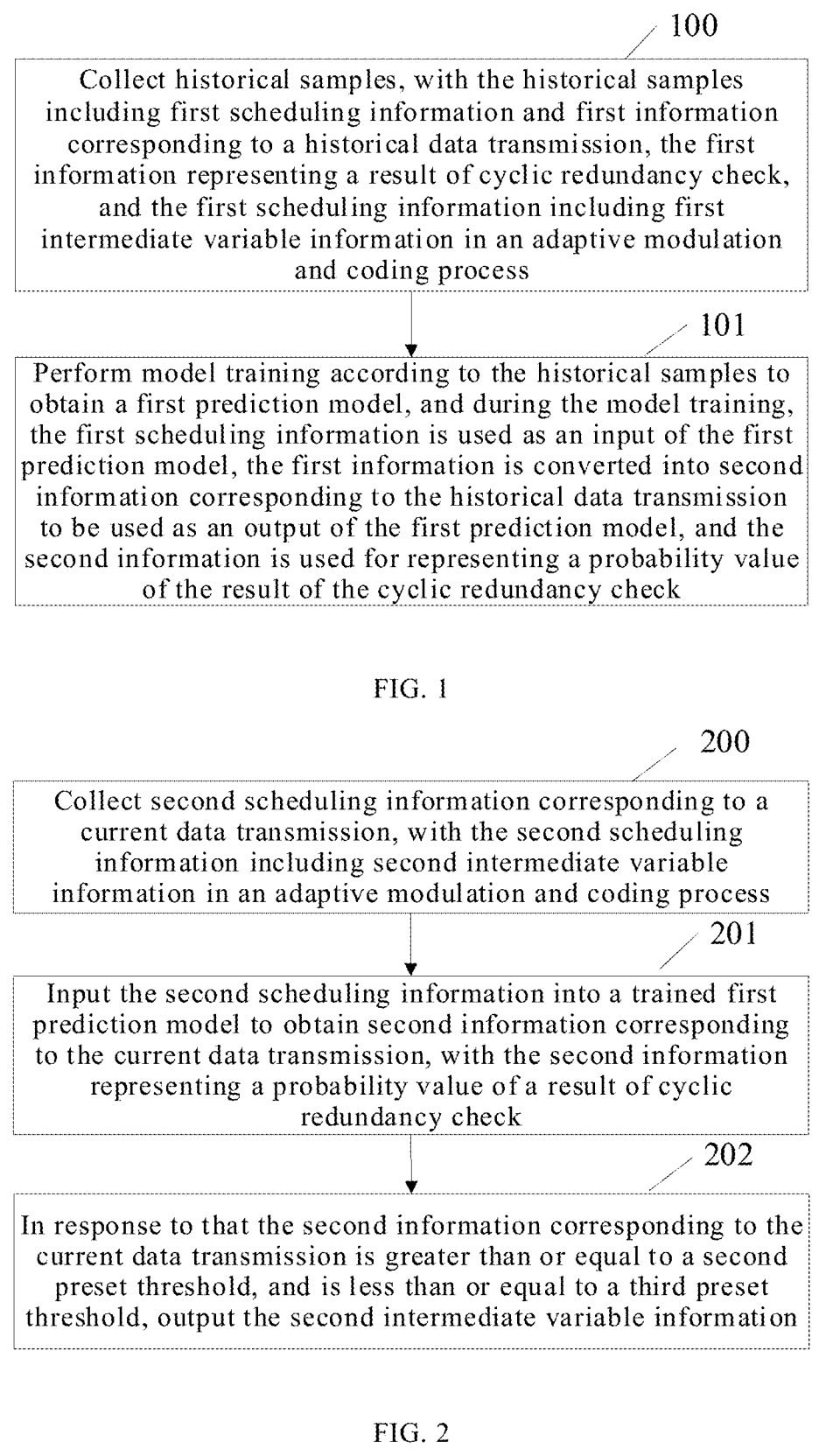

100

Collect historical samples, with the historical samples including first scheduling information and first information corresponding to a historical data transmission, the first information representing a result of cyclic redundancy check, and the first scheduling information including first intermediate variable information in an adaptive modulation and coding process

101

Perform model training according to the historical samples to obtain a first prediction model, and during the model training, the first scheduling information is used as an input of the first prediction model, the first information is converted into second information corresponding to the historical data transmission to be used as an output of the first prediction model, and the second information is used for representing a probability value of the result of the cyclic redundancy check

Collect second scheduling information corresponding to a current data transmission, with the second scheduling information including second intermediate variable information in an adaptive modulation and coding process

201

Input the second scheduling information into a trained first prediction model to obtain second information corresponding to the current data transmission, with the second information representing a probability value of a result of cyclic redundancy check

202

In response to that the second information corresponding to the current data transmission is greater than or equal to a second preset threshold, and is less than or equal to a third preset threshold, output the second intermediate variable information

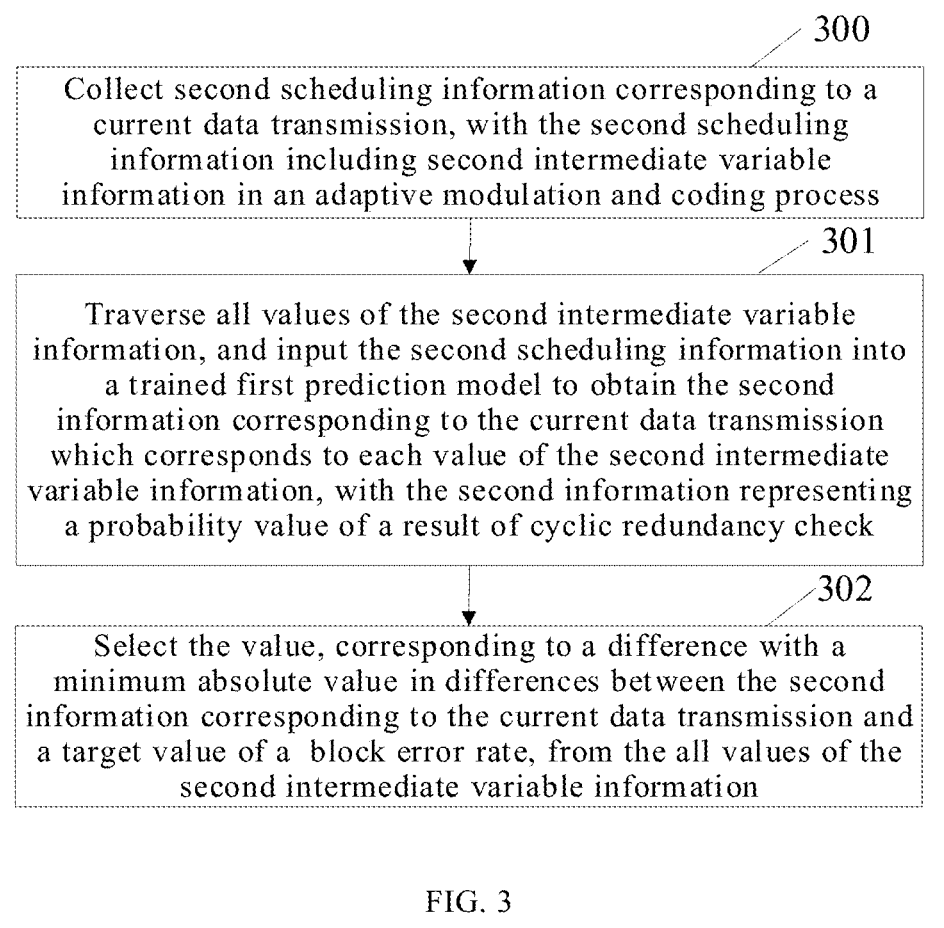

Collect second scheduling information corresponding to a current data transmission, with the second scheduling information including second intermediate variable information in an adaptive modulation and coding process

301

Traverse all values of the second intermediate variable information, and input the second scheduling information into a trained first prediction model to obtain the second information corresponding to the current data transmission which corresponds to each value of the second intermediate variable information, with the second information representing a probability value of a result of cyclic redundancy check

302

Select the value, corresponding to a difference with a minimum absolute value in differences between the second information corresponding to the current data transmission and a target value of a block error rate, from the all values of the second intermediate variable information

FIG. 3

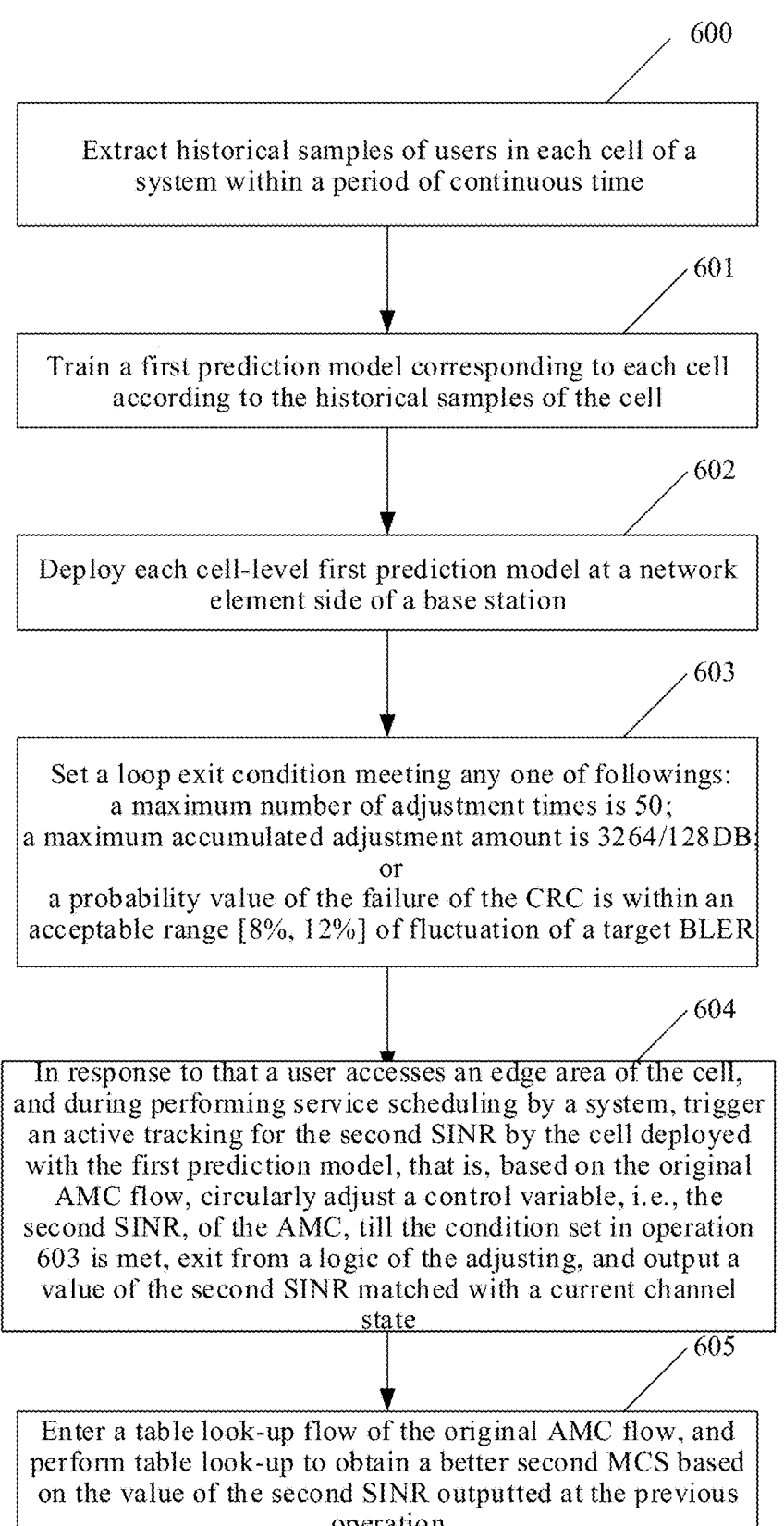

600

Extract historical samples of users in each cell of a system within a period of continuous time

601

Train a first prediction model corresponding to each cell according to the historical samples of the cell

602

Deploy each cell-level first prediction model at a network element side of a base station

603

Set a loop exit condition meeting any one of followings:
a maximum number of adjustment times is 50;
a maximum accumulated adjustment amount is 3264/128DB;
or
a probability value of the failure of the CRC is within an acceptable range [8%, 12%] of fluctuation of a target BLER

604

In response to that a user accesses an edge area of the cell, and during performing service scheduling by a system, trigger an active tracking for the second SINR by the cell deployed with the first prediction model, that is, based on the original AMC flow, circularly adjust a control variable, i.e., the second SINR, of the AMC, till the condition set in operation 603 is met, exit from a logic of the adjusting, and output a value of the second SINR matched with a current channel state

605

Enter a table look-up flow of the original AMC flow, and perform table look-up to obtain a better second MCS based on the value of the second SINR outputted at the previous operation

FIG. 6

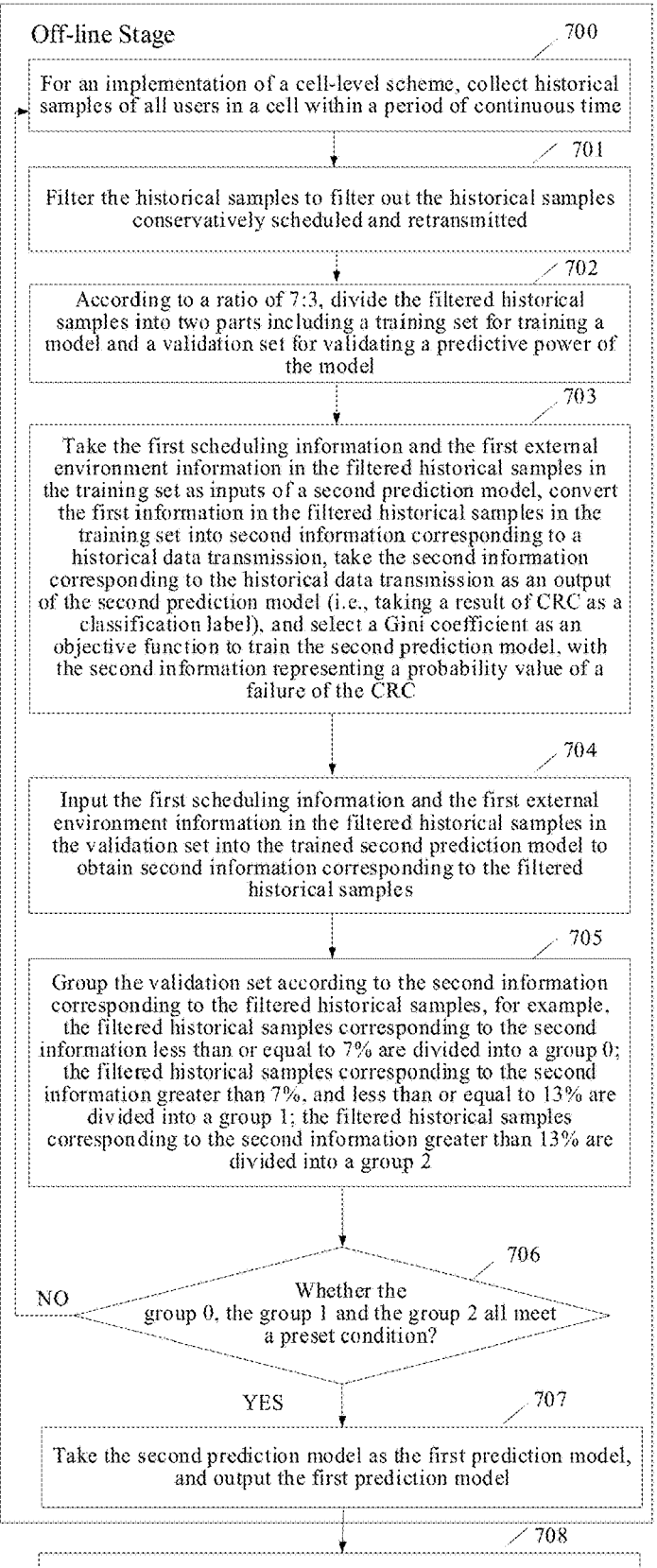

Off-line Stage                                    700

For an implementation of a cell-level scheme, collect historical samples of all users in a cell within a period of continuous time

701

Filter the historical samples to filter out the historical samples conservatively scheduled and retransmitted

702

According to a ratio of 7:3, divide the filtered historical samples into two parts including a training set for training a model and a validation set for validating a predictive power of the model

703

Take the first scheduling information and the first external environment information in the filtered historical samples in the training set as inputs of a second prediction model, convert the first information in the filtered historical samples in the training set into second information corresponding to a historical data transmission, take the second information corresponding to the historical data transmission as an output of the second prediction model (i.e., taking a result of CRC as a classification label), and select a Gini coefficient as an objective function to train the second prediction model, with the second information representing a probability value of a failure of the CRC

704

Input the first scheduling information and the first external environment information in the filtered historical samples in the validation set into the trained second prediction model to obtain second information corresponding to the filtered historical samples

705

Group the validation set according to the second information corresponding to the filtered historical samples, for example, the filtered historical samples corresponding to the second information less than or equal to 7% are divided into a group 0; the filtered historical samples corresponding to the second information greater than 7%, and less than or equal to 13% are divided into a group 1; the filtered historical samples corresponding to the second information greater than 13% are divided into a group 2

706

NO ← Whether the group 0, the group 1 and the group 2 all meet a preset condition?

YES                                    707

Take the second prediction model as the first prediction model, and output the first prediction model

708

Issue the first prediction model to a network element side, and trigger an active prediction function of an original AMC flow

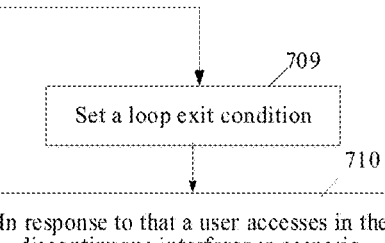

709

Set a loop exit condition

710

In response to that a user accesses in the discontinuous interference scenario, trigger an active tracking for the second SINR by the cell deployed with the first prediction model, that is, based on the original AMC flow, circularly adjust a control variable, i.e., the second SINR, of the AMC, till the loop exit condition is met, exit from a logic of the adjusting, and output a value of the second SINR matched with a current channel state

711

Enter a table look-up flow of the original AMC flow, and perform table look-up to obtain a better second MCS based on the value of the second SINR outputted at the previous operation

FIG. 7

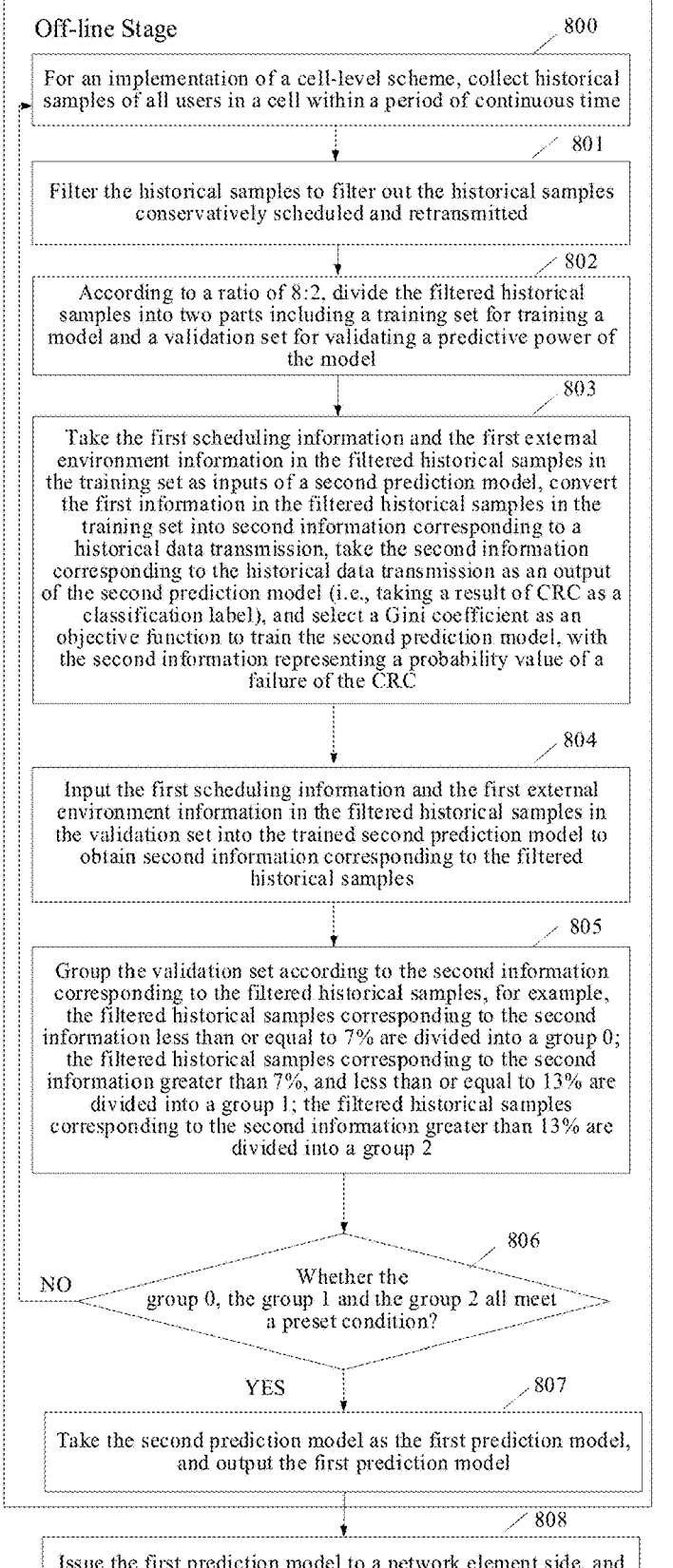

Off-line Stage                                                              800

For an implementation of a cell-level scheme, collect historical samples of all users in a cell within a period of continuous time

801

Filter the historical samples to filter out the historical samples conservatively scheduled and retransmitted

802

According to a ratio of 8:2, divide the filtered historical samples into two parts including a training set for training a model and a validation set for validating a predictive power of the model

803

Take the first scheduling information and the first external environment information in the filtered historical samples in the training set as inputs of a second prediction model, convert the first information in the filtered historical samples in the training set into second information corresponding to a historical data transmission, take the second information corresponding to the historical data transmission as an output of the second prediction model (i.e., taking a result of CRC as a classification label), and select a Gini coefficient as an objective function to train the second prediction model, with the second information representing a probability value of a failure of the CRC

804

Input the first scheduling information and the first external environment information in the filtered historical samples in the validation set into the trained second prediction model to obtain second information corresponding to the filtered historical samples

805

Group the validation set according to the second information corresponding to the filtered historical samples, for example, the filtered historical samples corresponding to the second information less than or equal to 7% are divided into a group 0; the filtered historical samples corresponding to the second information greater than 7%, and less than or equal to 13% are divided into a group 1; the filtered historical samples corresponding to the second information greater than 13% are divided into a group 2

806

NO        Whether the group 0, the group 1 and the group 2 all meet a preset condition?

YES                                                                         807

Take the second prediction model as the first prediction model, and output the first prediction model

808

Issue the first prediction model to a network element side, and trigger an active prediction function of an original AMC flow

809

Set a loop exit condition

810

In response to that a user accesses in the scenario of complex types of terminal chips, trigger an active tracking for the second SINR by the cell deployed with the first prediction model, that is, based on the original AMC flow, circularly adjust a control variable, i.e., the second SINR, of the AMC, till the loop exit condition is met, exit from a logic of the adjusting, and output a value of the second SINR matched with a current channel state

811

Enter a table look-up flow of the original AMC flow, and perform table look-up to obtain a better second MCS based on the value of the second SINR outputted at the previous operation

FIG. 8

MODEL TRAINING METHOD, CHANNEL ADJUSTMENT METHOD, ELECTRONIC DEVICE, AND COMPUTER READABLE STORAGE MEDIUM

CROSS-REFERENCE TO RELATED APPLICATIONS

The present application claims the priority of Chinese Patent Application No. 202110299486.3, filed on Mar. 19, 2021, the contents of which are incorporated herein in their entirety by reference.

TECHNICAL FIELD

The present application relates to the field of communication and data processing, and in particular, to a model training method, a channel adjustment method, an electronic device, and a computer readable storage medium.

BACKGROUND

Adaptive modulation and coding (AMC) is a key technology based on a physical layer of a link, and an uplink AMC scheme is similar to a downlink AMC scheme, i.e., a base station calculates corresponding adaptive parameters by measuring a quality of a current channel, obtains channel state information, and feeds back the channel state information to a user, to facilitate the user configuring subsequent better transmission parameters.

A core of the AMC is to select a better modulation and coding scheme (MCS) suitable for a channel transmission condition under given resource and channel environment, fully utilize limited resources to cope with influences caused by channel changes, and under a condition of meeting an expectation of a block error rate (BLER) of a system, obtain a greater throughput.

Generally, a selection of the MCS is closely related to actual communication channel conditions, if the communication channel conditions are good, a higher MCS may be used, thereby improving the throughput of the system, and if the communication channel conditions are poor, a lower MCS may be used, thereby increasing reliability of transmission. Therefore, a determination of the MCS directly affects performance of throughput of the system.

SUMMARY

In a first aspect, the present application provides a model training method, including: collecting historical samples, with the historical samples including first scheduling information and first information corresponding to historical data transmission, the first information representing a result of cyclic redundancy check, and the first scheduling information including first intermediate variable information in an adaptive modulation and coding process; and performing model training according to the historical samples to obtain a first prediction model, and during the model training, the first scheduling information is used as an input of the first prediction model, the first information is converted into second information corresponding to the historical data transmission to be used as an output of the first prediction model, and the second information is used for representing a probability value of the result of cyclic redundancy check.

In a second aspect, the present application provides a channel adjustment method, including: collecting second scheduling information corresponding to a current data transmission, with the second scheduling information including second intermediate variable information in an adaptive modulation and coding process: inputting the second scheduling information into a trained first prediction model to obtain second information corresponding to the current data transmission, with the second information representing a probability value of a result of cyclic redundancy check; and in response to that the second information corresponding to the current data transmission is greater than or equal to a first threshold, and is less than or equal to a second threshold, outputting the second intermediate variable information.

In a third aspect, the present application provides a channel adjustment method, including: collecting second scheduling information corresponding to a current data transmission, with the second scheduling information including second intermediate variable information in an adaptive modulation and coding process: traversing all values of the second intermediate variable information, and inputting the second scheduling information into a trained first prediction model to obtain the second information corresponding to the current data transmission which corresponds to each value of the second intermediate variable information, with the second information representing a probability value of a result of cyclic redundancy check; and selecting a value corresponding to a difference with a minimum absolute value in differences between the second information corresponding to the current data transmission and a target value of a block error rate, from all the values of the second intermediate variable information.

In a fourth aspect, the present application provides an electronic device, including: at least one processor; and a memory having at least one computer program stored thereon, the at least one computer program, executed by the at least one processor, causes the at least one processor to implement the model training method described in the first aspect, or the channel adjustment method described in the second aspect or the third aspect.

In a fifth aspect, the present application provides a computer-readable storage medium having a computer program stored thereon, the computer program, executed by a processor, causes the processor to implement the model training method described in the first aspect, or the channel adjustment method described in the second aspect or the third aspect.

BRIEF DESCRIPTION OF DRAWINGS

FIG. 1 is a flowchart of a model training method according to the present application;

FIG. 2 is a flowchart of a channel adjustment method according to the present application:

FIG. 3 is a flowchart of a channel adjustment method according to the present application:

FIG. 6 is a flowchart of a channel adjustment method provided in Example 2 according to the present application:

FIG. 7 is a flowchart of a channel adjustment method provided in Example 3 according to the present application:

FIG. 8 is a flowchart of a channel adjustment method provided in Example 4 according to the present application:

DETAILED DESCRIPTION

Figure 4:
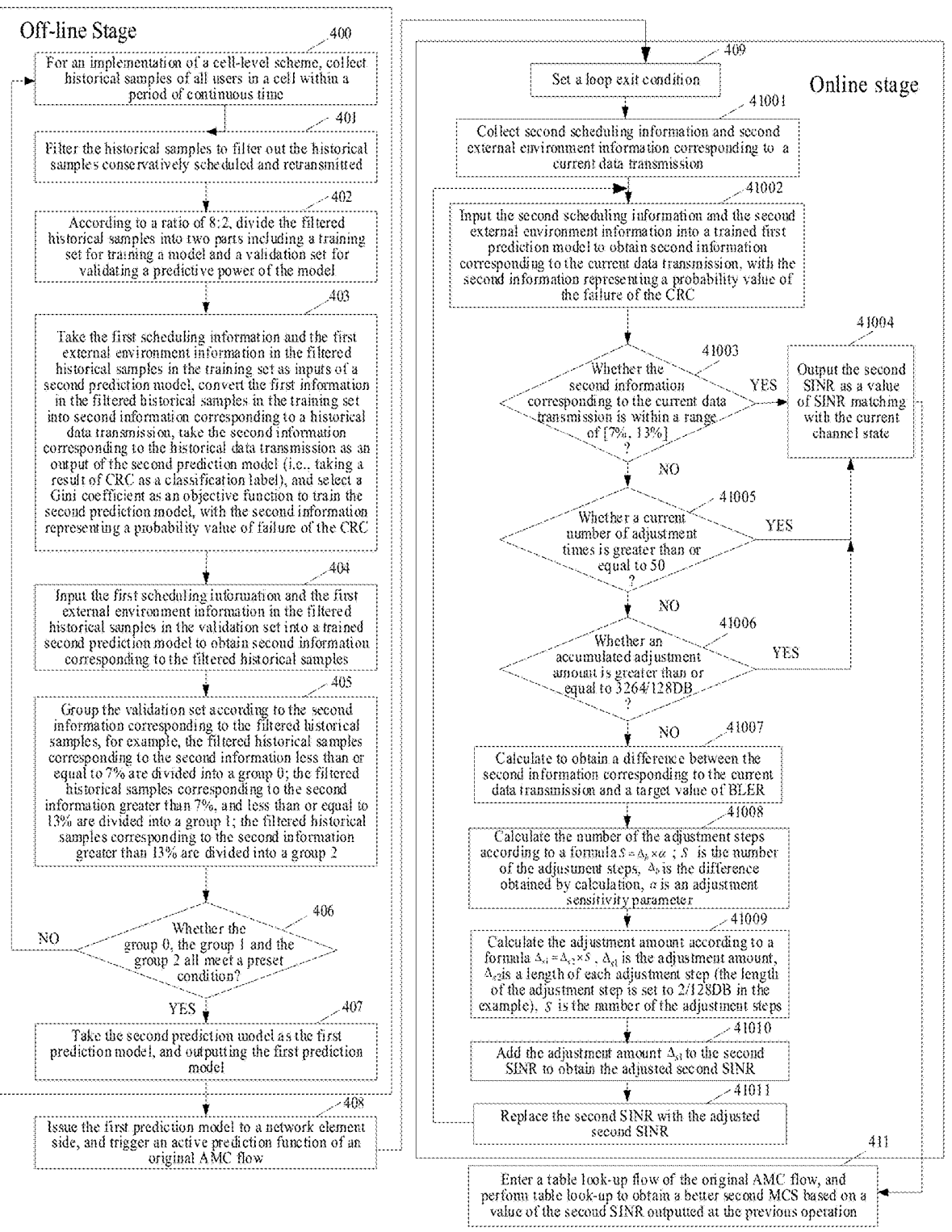
FIG. 4 is a flowchart of a channel adjustment method provided in Example 1 according to the present application.

In order to make those skilled in the art better understand the technical solutions of the present application, a model training method, a channel adjustment method, an electronic device, and a computer readable storage medium provided in the present application are further described in detail below with reference to the accompanying drawings.

Exemplary implementations are described in detail below with reference to the accompanying drawings, but may be embodied in different forms, and should not be construed as a limitation. The implementations are illustrated to make the present application more thorough and complete, and for those skilled in the art more fully understanding the scope of the present application.

The implementations of the present application and the technical features in the implementations may be combined with each other if no conflict is incurred.

As used herein, a term "and/or" includes any and all combinations of at least one of listed items.

The terms used in the present application are for a purpose of describing particular implementations only, and are not intended to limit the present application. As used in the present application, singular forms "a" and "the" are intended to include plural forms as well, i.e., to represent at least one, unless the context clearly defines otherwise. It should further be understood that terms "includes/comprises" and/or "made of/consisted of" in the present application are used to specify a presence of at least one of recited features, integers, steps, operations, elements or components, but do not preclude a presence or an addition of at least one of other features, integers, steps, operations, elements, components or groups thereof.

Unless otherwise defined, meanings of all terms (including technical terms and scientific terms) used herein are the same as meanings commonly understood by one of ordinary skill in the art. It should further be understood that terms, such as those defined in common dictionaries, should be construed as having a meaning that is consistent with that in background of the existing art and the present application, and should not be construed as having an idealized or over-formal meaning, unless expressly defined in the present application.

In a current AMC scheme, a channel quality measurement indicator, or referred to as channel state information (CSI), is defined first, and in a wireless communication system, a signal to interference plus noise ratio (SINR) is generally used as the channel quality measurement indicator, a mapping relationship exists between the SINR and a modulation and coding scheme (MCS), and the SINR may be regarded as a control parameter of the MCS.

A current channel adjustment method generally includes: a receiving terminal measures the SINR: the receiving terminal adjusts the measured SINR according to a result of cyclic redundancy check (CRC) of a latest data transmission: the receiving terminal selects a corresponding MCS based on the adjusted SINR and the mapping relationship; and the receiving terminal feeds back the selected MCS to a sending terminal.

The current channel adjustment method has following problems: (1) the channel quality measurement indicator cannot fully reflect a channel state, because performance of a link is related to many system parameters, and referring only to the channel quality measurement indicator may result in an erroneous judgment on the channel quality: (2) a feedback of the channel quality measurement indicator has a time delay, and it is difficult for a base station to obtain an accurate real-time CSI, that is, the CSI fed-back cannot completely represent a channel environment at a next moment, and thus the MCS selected according to the current CSI may be not a relatively good configuration of subsequent transmission parameters, thereby weakening performance of the system; and (3) the measured SINR is adjusted by taking a fixed step length as an adjustment amount according to the actual result of CRC, and it is difficult to quickly track changes in an external environment such as the channel state.

FIG. 1 is a flowchart of a model training method according to the present application.

In a first aspect, referring to FIG. 1, the present application provides a model training method, including following operations 100 and 101.

At operation 100, collecting historical samples, with the historical samples including first scheduling information and first information corresponding to historical data transmission, the first information representing a result of cyclic redundancy check, and the first scheduling information including first intermediate variable information in an adaptive modulation and coding process.

In the present application, the collected historical samples are expected to meet a diversity expectation, cover all data characteristics of a cell as much as possible, and ensure that a trained model is convergent.

In the present application, the first information includes information for representing a success of the CRC or information for representing a failure of the CRC. For each historical data transmission, in response to that the CRC of the historical data transmission is successful, the first information is used for representing the success of the CRC, in response to that the CRC of the historical data transmission is failed, the first information is used for representing the failure of the CRC.

In the present application, meanings of the first information in different historical samples may be the same or different. That is, the first information in some historical samples is used to represent the success of the CRC, and the first information in other historical samples is used to represent the failure of the CRC.

In some implementations, in response to that the CRC of the historical data transmission is successful, the first information is indicated by a first value and used for representing the success of the CRC, in response to that the CRC of the historical data transmission is failed, the first information is indicated by a second value and used for representing the failure of the CRC.

For example, the first value is 1, and the second value is 0; or, the first value is 0, and the second value is 1.

In the present application, the first scheduling information is used to describe scheduling information affecting the channel quality during the historical data transmission.

In the present application, the first intermediate variable information in the AMC process is variable information to be determined in a channel adjustment process.

In some implementations, the first intermediate variable information in the AMC process includes any one of followings: a first modulation and coding scheme (MCS) corresponding to the historical data transmission, or a first SINR corresponding to the historical data transmission.

In the present application, in response to that the SINR is used as the variable information to be determined in the channel adjustment process, an original AMC flow is not to be changed in the channel adjustment process: in response to that the MCS is used as the variable information to be determined in the channel adjustment process, the original AMC flow is to be changed in the channel adjustment process.

In some implementations, the first scheduling information further includes at least one of followings: first resource block (RB) information for scheduling the historical data transmission, or first slot information for scheduling the historical data transmission.

In the present application, the first RB information for scheduling the historical data transmission refers to information of RBs occupied for performing the historical data transmission, for example, the number of the RBs, locations of the RBs, and the like.

In the present application, the first slot information for scheduling the historical data transmission refers to information of slots occupied for performing the historical data transmission, for example, the number of the slots, locations of the slots, and the like.

In some implementations, the historical samples further includes first external environmental information: correspondingly, the first scheduling information and the first external environment information are used as inputs of the first prediction model during the model training.

In the present application, the first external environment information is used to describe external environment information affecting the channel quality during the historical data transmission.

In some implementations, the first external environment information includes at least one of followings: a first chip type of a receiving terminal of the historical data transmission, a first path loss between a sending terminal and the receiving terminal of the historical data transmission, first air interface measurement information between the sending terminal and the receiving terminal of the historical data transmission, or a first power margin of the sending terminal of the historical data transmission.

In the present application, the first air interface measurement information may be, for example, a transmission power of the sending terminal of the historical data transmission, or inter-cell interference information during performing the historical data transmission.

At operation 101, performing model training according to the historical samples to obtain a first prediction model, and during the model training, the first scheduling information is used as an input of the first prediction model, the first information is converted into second information corresponding to the historical data transmission to be used as an output of the first prediction model, and the second information is used for representing a probability value of the result of the cyclic redundancy check.

In the present application, the second information includes a probability value representing a success of the CRC or a probability value representing a failure of the CRC.

In the present application, the first scheduling information in the historical samples is input into the first prediction model to obtain the second information corresponding to the historical samples, and the second information corresponding to different historical samples have the same meaning. That is, the second information corresponding to all the historical samples is used to represent the probability value of the success of the CRC or used to represent the probability value of the failure of the CRC.

In the present application, the first information in the historical samples actually may be converted into the second information corresponding to the historical samples. For each historical data transmission, in response to that the CRC of the historical data transmission is successful, the probability of the success of the CRC of the historical data transmission may be considered as 100%, and the probability of the failure of the CRC of the historical data transmission is considered as 0%: in response to that the CRC of the historical data transmission is failed, the probability of the success of the CRC of the historical data transmission may be considered as 0%, the probability of the failure of the CRC of the historical data transmission is considered as 100%.

In the present application, the historical samples may be not processed, and the model training is directly performed according to the historical samples to obtain the first prediction model: the historical samples may also be filtered, and the model training is performed according to the filtered historical samples to obtain the first prediction model.

In some implementations, the historical samples being filtered refers to filtering out the historical samples conservatively scheduled and the historical samples retransmitted, because the channel quality cannot be accurately reflected by the historical samples conservatively scheduled and the historical samples retransmitted, and an accuracy of the model training can be improved by filtering out the historical samples conservatively scheduled and the historical samples retransmitted.

In the present application, in response to that the collected historical samples do not include the historical samples conservatively scheduled and the historical samples retransmitted, or the historical samples conservatively scheduled and the historical samples retransmitted have been discarded during collecting the historical samples, the historical samples may not be processed, and the model training is directly performed according to the historical samples to obtain the first prediction model.

In some implementations, data conservatively scheduled and data retransmitted have corresponding identifiers respectively during a transmission process, and whether any data is the data conservatively scheduled or the data retransmitted can be known by identifying the identifiers.

Two cases of performing model training according to two different historical samples mentioned above are respectively described below.

In a first case, the historical samples are not to be processed, and the model training is directly performed according to the historical samples to obtain the first prediction model.

In the present application, the model training may be performed in various manners, for example, in any one of following manners, but the specific model training manners (i.e., specific manners for performing the model training) are not used to limit the protection scope of the present application.

Two achievable model training manners are listed below.

In a first manner, a machine learning manner is adopted for model training.

In some implementations, the performing model training according to the historical samples to obtain a first prediction model includes: dividing the historical samples into a training set and a validation set: performing model training according to the training set to obtain a second prediction model: performing validation on the second prediction model by adopting the validation set; and in response to that the validation is successful, taking the second prediction model as the first prediction model.

In some implementations, the second prediction model can be obtained by training a classifier according to the training set, i.e., the second prediction model is a decision tree classifier.

In some implementations, the classifier may be a decision tree classifier implemented by using a derivative algorithm based on a decision tree such as a random forest, or may also be a classifier implemented by using a classification algorithm based on a neural network, but any algorithm being specifically used for implementing the classifier is not used for limiting the protection scope of the present application, and thus is not repeated herein.

In some implementations, the performing model training according to the training set to obtain a second prediction model may include to obtain the second prediction model by performing model training using any one of a Gini coefficient, an information entropy, or a relative entropy as an objective function for training, with the first information serving as a classification label.

In some implementations, the performing model training according to the historical samples to obtain a first prediction model further includes: in response to that the validation for the second prediction model is failure, continuing to execute the collecting historical samples until the validation is successful.

In the present application, in response to that the validation for the second prediction model is successful, it is indicated that the historical samples of the training set meet a diversity expectation, i.e., the second prediction model is convergent, and the second prediction model is taken as the first prediction model to be output; and in response to that the validation for the second prediction model is failure, it is indicated that the historical samples of the training set do not meet the diversity expectation, i.e., the second prediction model is not convergent, the historical samples are expected to be recollected, to perform model training again. That is, the present application guarantees the diversity of the collected historical samples by attempting to collect new historical samples repeatedly.

In the present application, during the model training, the first information in the historical samples is converted into the second information, corresponding to the historical data transmission, to be used as the output of the second prediction model, therefore, a special mode is desired to be designed to validate the second prediction model.

In some implementations, the performing validation on the second prediction model by adopting the validation set includes: inputting the first scheduling information in each historical sample in the validation set into the second prediction model to obtain the second information corresponding to the historical sample: grouping the validation set according to the second information corresponding to the historical samples: in response to that each group meets a preset condition, the validation is successful; and in response to that at least one group does not meet the preset condition, the validation is failure: any group meeting the preset condition includes: an absolute value of a difference between a mean value of probability values corresponding to the group and the second information, corresponding to the group, obtained statistically is less than or equal to a first preset threshold: the mean value of the probability values corresponding to the group is a mean value of the second information corresponding to all the historical samples in the group; and the second information corresponding to the group is statistically obtained according to the first information in all the historical samples in the group.

In some implementations, the grouping the validation set according to the second information corresponding to the historical samples includes: dividing the historical samples, in the validation set, corresponding to the second information located within a same value range into a same group.

For example, in the validation set, the historical samples corresponding to the second information less than or equal to 7% are divided into a group 0; in the validation set, the historical samples corresponding to the second information greater than 7%, and less than or equal to 13% are divided into a group 1: in the validation set, the historical samples corresponding to the second information greater than 13% are divided into a group 2.

In some implementations, the second information corresponding to each group includes: a ratio of the number of the historical samples with the first information representing the success of the CRC in the group to the number of all the historical samples in the group; or a ratio of the number of the historical samples with the first information representing the failure of the CRC in the group to the number of all the historical samples in the group.

It should be noted that, in response to that the second information represents a probability value of the success of the CRC, the second information corresponding to the group is a ratio of the number of the historical samples with the first information representing the success of the CRC in the group to the number of all the historical samples in the group: in response to that the second information represents a probability value of the failure of the CRC, the second information corresponding to the group is a ratio of the number of the historical samples with the first information representing the failure of the CRC in the group to the number of all the historical samples in the group.

For example, mean values of probability values corresponding to three groups mentioned above and the second information obtained by statistics are shown in following Table 1.

TABLE 1

| Group Number | Mean value of probability values corresponding to each group | Second information obtained by statistics | The number of the historical samples within each group |
| --- | --- | --- | --- |
| 0 | 0.007126 | 0.005114 | 46537 |
| 1 | 0.087345 | 0.069647 | 5212 |
| 2 | 0.359611 | 0.332070 | 7122 |

From the data in Table 1, an absolute value of a difference between the mean value of probability values corresponding to the group 0 and the second information obtained by statistics corresponding to the group 0 is calculated to be 0.002012, i.e., 0.2012%: an absolute value of a difference between the mean value of probability values corresponding to the group 1 and the second information obtained by statistics corresponding to the group 1 is 0.017698, i.e., 1.7698%; an absolute value of a difference between the mean value of probability values corresponding to the group 2 and the second information obtained by statistics corresponding to the group 2 is 0.027541, i.e., 2.7541%; it can be seen that a mean value of absolute values of differences of the three groups is less than the first preset threshold, i.e., 3%, the second prediction model is considered to meet the preset condition, and is directly output as the first prediction model.

In a second manner, a cluster analysis manner is adopted for model training.

In some implementations, the performing model training according to the historical samples to obtain a first prediction model includes: performing cluster analysis on the historical samples to obtain M categories: M is an integer greater than or equal to 1; and for each category, calculating the second information corresponding to the category according to the first information in the historical samples in the category.

In some implementations, the performing cluster analysis on the historical samples to obtain M categories includes: initializing M centers; calculating distances between each historical sample and the M centers respectively; allocating each historical sample to the center closest to the historical sample; and recalculating mean values of the M centers, respectively taking the mean value of each center as a new center, and continuously executing the calculating distances between each historical sample and the M centers respectively, until an exit condition is met.

The exit condition may be that none of the M centers changes, or only a very little change occurs in the M centers, or a preset number of cycles is reached, and the like, which is not specifically used to limit the protection scope of the present application, and is not repeated herein.

In some implementations, the calculating the second information corresponding to the category according to the first information in the historical samples in the category includes determining the second information corresponding to the category, including a ratio of the number of the historical samples with the first information representing the success of the CRC in the category to the number of all the historical samples in the category, or, a ratio of the number of the historical samples with the first information representing the failure of the CRC in the category to the number of all the historical samples in the category.

It should be noted that, in response to that the second information represents a probability value of the success of the CRC, the second information corresponding to the category is a ratio of the number of the historical samples with the first information representing the success of CRC in the category to the number of all the historical samples in the category: in response to that the second information represents a probability value of the failure of the CRC, the second information corresponding to the category is a ratio of the number of the historical samples with the first information representing the failure of the CRC in the category to the number of all the historical samples in the category.

In a second case, the historical samples are filtered, and the model training is performed according to the filtered historical samples to obtain the first prediction model.

In the present application, the model training may be performed in various manners, for example, in any one of following manners, but the specific manners for performing the model training are not used to limit the protection scope of the present application.

Two achievable model training manners are listed below.

In a first manner, a machine learning manner is adopted for model training.

In some implementations, the performing model training according to the filtered historical samples to obtain the first prediction model includes: dividing the filtered historical samples into a training set and a validation set: performing the model training according to the training set to obtain a second prediction model: performing validation on the second prediction model by adopting the validation set; and in response to that the validation is successful, taking the second prediction model as the first prediction model.

In some implementations, the second prediction model can be obtained by training a classifier according to the training set, i.e., the second prediction model is a decision tree classifier.

In some implementations, the classifier may be a decision tree classifier implemented by using a derivative algorithm based on a decision tree such as a random forest, or may also be a classifier implemented by using a classification algorithm based on a neural network, but any algorithm being specifically used for implementing the classifier is not used for limiting the protection scope of the present application, and thus is not repeated herein.

In some implementations, the performing model training according to the training set to obtain a second prediction model may include to obtain the second prediction model by performing model training using any one of a Gini coefficient, an information entropy, or a relative entropy as an objective function for training, with the first information serving as a classification label.

In some implementations, the performing model training according to the filtered historical samples to obtain the first prediction model further includes: in response to that the validation for the second prediction model is failure, continuing to execute the collecting historical samples until the validation is successful.

In the present application, in response to that the validation for the second prediction model is successful, it is indicated that the historical samples of the training set meet a diversity expectation, i.e., the second prediction model is convergent, and the second prediction model is taken as the first prediction model to be output; and in response to that the validation for the second prediction model is failure, it is indicated that the historical samples of the training set do not meet the diversity expectation, i.e., the second prediction model is not convergent, the historical samples are expected to be recollected, to perform the model training again. That is, the present application guarantees the diversity of the collected historical samples by attempting to collect new historical samples repeatedly.

In the present application, during the model training, the first information in the historical samples is converted into the second information corresponding to the historical data transmission to be used as the output of the second prediction model, therefore, a special mode is desired to be designed to validate the second prediction model.

In some implementations, the performing validation on the second prediction model by adopting the validation set includes: inputting the first scheduling information in each filtered historical sample in the validation set into the second prediction model to obtain the second information corresponding to the filtered historical sample: grouping the validation set according to the second information corresponding to the filtered historical samples: in response to that all groups meet a preset condition, the validation is successful; and in response to that at least one group does not meet the preset condition, the validation is failure: any group meeting the preset condition includes: an absolute value of a difference between a mean value of probability values corresponding to the group and the second information, corresponding to the group, obtained statistically is less than or equal to a first preset threshold: the mean value of the probability values corresponding to the group is a mean value of the second information corresponding to all the filtered historical samples in the group; and the second information corresponding to the group is statistically obtained according to the first information in all the filtered historical samples in the group.

In some implementations, the grouping the validation set according to the second information corresponding to the filtered historical samples includes: dividing the filtered historical samples, in the validation set, corresponding to the second information located within a same value range into a same group.

For example, in the validation set, the filtered historical samples corresponding to the second information less than or equal to 7% are divided into a group 0: in the validation set, the filtered historical samples corresponding to the second information greater than 7%, and less than or equal to 13% are divided into a group 1: in the validation set, the filtered historical samples corresponding to the second information greater than 13% are divided into a group 2.

In some implementations, the second information corresponding to the group includes: a ratio of the number of the filtered historical samples with the first information representing the success of the CRC in the group to the number of all the filtered historical samples in the group; or a ratio of the number of the filtered historical samples with the first information representing the failure of the CRC in the group to the number of all the filtered historical samples in the group.

It should be noted that, in response to that the second information represents a probability value of the success of the CRC, the second information corresponding to the group is a ratio of the number of the filtered historical samples with the first information representing the success of the CRC in the group to the number of all the filtered historical samples in the group: in response to that the second information represents a probability value of the failure of the CRC, the second information corresponding to the group is a ratio of the number of the filtered historical samples with the first information representing the failure of the CRC in the group to the number of all the filtered historical samples in the group.

For example, mean values of probability values corresponding to three groups mentioned above and the second information obtained by statistics are shown in Table 1.

From the data in Table 1, an absolute value of a difference between a mean value of probability values corresponding to the group 0 and the second information obtained by statistics corresponding to the group 0 is calculated to be 0.002012, i.e., 0.2012%: an absolute value of a difference between a mean value of probability values corresponding to the group 1 and the second information obtained by statistics corresponding to the group 1 is 0.017698, i.e., 1.7698%; an absolute value of a difference between a mean value of probability values corresponding to the group 2 and the second information obtained by statistics corresponding to the group 2 is 0.027541, i.e., 2.7541%; it can be seen that a mean value of absolute values of differences of the three groups is less than the first preset threshold, i.e., 3%, the second prediction model is considered to meet the preset condition, and is directly output as the first prediction model.

In a second manner, a cluster analysis manner is adopted for model training.

In some implementations, the performing model training according to the filtered historical samples to obtain a first prediction model includes: performing cluster analysis on the filtered historical samples to obtain M categories: M is an integer greater than or equal to 1; and for each category, calculating the second information corresponding to the category according to the first information in the filtered historical samples in the category.

In some implementations, the performing cluster analysis on the filtered historical samples to obtain M categories includes: initializing M centers; calculating distances between each filtered historical sample and the M centers respectively: allocating each filtered historical sample to the center closest to the filtered historical sample; and recalculating mean values of the M centers, respectively taking a mean value of each center as a new center, and continuously executing the calculating distances between each filtered historical sample and the M centers respectively, until an exit condition is met.

The exit condition may be that none of the M centers changes, or a very little change occurs in the M centers, or a preset number of cycles is reached, and the like, which is not specifically used to limit the protection scope of the present application, and is not repeated herein.

In some implementations, the calculating the second information corresponding to the category according to the first information in the filtered historical samples in the category includes determining the second information corresponding to the category, including a ratio of the number of the filtered historical samples with the first information representing the success of the CRC in the category to the number of all the filtered historical samples in the category, or, a ratio of the number of the filtered historical samples with the first information representing the failure of the CRC in the category to the number of all the filtered historical samples in the category.

It should be noted that, in response to that the second information represents a probability value of the success of the CRC, the second information corresponding to the category is a ratio of the number of the filtered historical samples with the first information representing the success of the CRC in the category to the number of all the filtered historical samples in the category: in response to that the second information represents a probability value of the failure of the CRC, the second information corresponding to the category is a ratio of the number of the filtered historical samples with the first information representing the failure of the CRC in the category to the number of all the filtered historical samples in the one category.

According to the model training method provided in the present application, the first prediction model is obtained by performing model training based on the historical samples corresponding to the historical data transmission, so that in a subsequent channel adjustment process, the probability value of the result of the CRC can be predicted based on the trained first prediction model, and the channel adjustment is performed based on the predicted probability value, and is not performed based on a latest result of the CRC, and a foundation is laid for the subsequent channel adjustment.

In some implementations, the historical samples include the first scheduling information, the first external environment information and the first information, and the first scheduling information and the first external environment information are used as inputs of the first prediction model, i.e., the channel state is more comprehensively reflected by the first scheduling information and the first external environment information, so that an accuracy of determining the channel quality is improved.

FIG. 2 is a flowchart of a channel adjustment method according to the present application.

In a second aspect, referring to FIG. 2, the present application provides a channel adjustment method, including following operations 200 to 202.

At operation 200, collecting second scheduling information corresponding to a current data transmission, with the second scheduling information including second intermediate variable information in an adaptive modulation and coding (AMC) process.

In some implementations, the current data transmission refers to a transmission of data other than data conservatively scheduled and retransmitted.

In the present application, the second scheduling information is used to describe scheduling information affecting the channel quality during the current data transmission.

In the present application, the second intermediate variable information in the AMC process is variable information to be determined in a channel adjustment process.

In some implementations, the second intermediate variable information in the AMC process includes any one of followings: a second MCS corresponding to the current data transmission or a second SINR corresponding to the current data transmission.

In the present application, in response to that the SINR is used as the variable information to be determined in the channel adjustment process, an original AMC flow is not to be changed in the channel adjustment process: in response to that the MCS is used as the variable information to be determined in the channel adjustment process, the original AMC flow is to be changed in the channel adjustment process.

In some implementations, the second scheduling information further includes at least one of followings: second RB information for scheduling the current data transmission, or second slot information for scheduling the current data transmission.

In the present application, the second RB information for scheduling the current data transmission refers to information of RBs occupied for performing the current data transmission, for example, the number of the RBs, locations of the RBs, and the like.

In the present application, the second slot information for scheduling the current data transmission refers to information of slots occupied for performing the current data transmission, for example, the number of the slots, locations of the slots, and the like.

In some implementations, the collecting second scheduling information corresponding to a current data transmission includes: collecting second scheduling information and second external environment information corresponding to the current data transmission.

In the present application, the second external environment information is used to describe external environment information affecting the channel quality during the current data transmission.

In some implementations, the second external environmental information includes at least one of followings: a second chip type of a receiving terminal of the current data transmission, a second path loss between a sending terminal and the receiving terminal of the current data transmission, second air interface measurement information between the sending terminal and the receiving terminal of the current data transmission, or a second power margin of the sending terminal of the current data transmission.

In the present application, the second air interface measurement information may be, for example, a transmission power of the sending terminal of the current data transmission, or inter-cell interference information during performing the current data transmission.

At operation 201, inputting the second scheduling information into a trained first prediction model to obtain second information corresponding to the current data transmission, with the second information representing a probability value of a result of cyclic redundancy check (CRC).

In the present application, the second information includes a probability value representing a success of the CRC or a probability value representing a failure of the CRC.

In some implementations, the inputting the second scheduling information into a trained first prediction model to obtain second information corresponding to the current data transmission includes: inputting the second scheduling information and the second external environment information into the trained first prediction model to obtain the second information corresponding to the current data transmission.

At operation 202, in response to that the second information corresponding to the current data transmission is greater than or equal to a first threshold, and is less than or equal to a second threshold, outputting the second intermediate variable information.

In some implementations, the first threshold is less than the second threshold.

In some implementations, the channel adjustment method further includes: in response to that the second information corresponding to the current data transmission is less than the first threshold, or greater than the second threshold, adjusting the second intermediate variable information according to the second information corresponding to the current data transmission; and replacing the second intermediate variable information with the adjusted second intermediate variable information, and continuing to execute the inputting the second scheduling information into the trained first prediction model to obtain the second information corresponding to the current data transmission, until a loop exit condition is met: the loop exit condition met includes any one of: the number of adjustment times is greater than or equal to a preset maximum number of adjustment times: the second information corresponding to the current data transmission is greater than or equal to the first threshold and less than or equal to the second threshold; or an accumulated adjustment amount is greater than or equal to a preset maximum accumulated adjustment amount: the accumulated adjustment amount is a sum of adjustment amounts corresponding to previous N adjustments, N is the current number of the adjustment times (i.e., the number of the adjustments performed), and the adjustment amount corresponding to each adjustment is a difference between the adjusted second intermediate variable information corresponding to the adjustment and the second intermediate variable information before the adjustment.

In some implementations, the adjusting the second intermediate variable information according to the second information corresponding to the current data transmission includes: calculating to obtain a difference between the second information corresponding to the current data transmission and a target value of a block error rate (BLER); determining the number of adjustment steps according to the difference; determining an adjustment amount according to the number of the adjustment steps; and adding the adjustment amount to the second intermediate variable information to obtain the adjusted second intermediate variable information.

In some implementations, the determining the number of adjustment steps according to the difference includes: calculating the number of the adjustment steps according to a formula $S=\Delta_b\times\alpha$; S is the number of the adjustment steps, $\Delta_b$ is the difference obtained by calculation, $\alpha$ is an adjustment sensitivity parameter.

In the present application, an adjustment sensitivity parameter corresponding to the second SINR is different from an adjustment sensitivity parameter corresponding to the second MCS.

In some implementations, the determining an adjustment amount according to the number of the adjustment steps includes: calculating the adjustment amount according to a formula $\Delta_{s1}=\Delta_{s2}\times S$, $\Delta_{s1}$ is the adjustment amount, $\Delta_{s2}$ is a length of each adjustment step, S is the number of the adjustment steps.

In the present application, the length of the adjustment step corresponding to the second SINR is different from the length of the adjustment step corresponding to the second MCS.

In some implementations, in response to that the second information corresponding to the current data transmission is less than the first threshold, $\Delta_{s2}$ is greater than 0, i.e., the second intermediate variable information is to be increased; and in response to that the second information corresponding to the current data transmission is greater than the second threshold, $\Delta_{s2}$ is less than 0, i.e., the second intermediate variable information is to be reduced.

In some implementations, the second intermediate variable information is the second SINR: correspondingly, the channel adjustment method further includes: after outputting the adjusted second intermediate variable information, determining the MCS corresponding to the adjusted second SINR according to a mapping relationship between the SINR and the MCS.

In some implementations, the channel adjustment method further includes: before the collecting second scheduling information corresponding to a current data transmission, collecting historical samples, with the historical samples including first scheduling information and first information corresponding to a historical data transmission, the first information representing the result of the cyclic redundancy check, and the first scheduling information including first intermediate variable information in an adaptive modulation and coding process; and performing model training according to the historical samples to obtain a first prediction model, and during the model training, the first scheduling information is used as an input of the first prediction model, the first information is converted into second information corresponding to the historical data transmission to be used as an output of the first prediction model.

In the present application, specific processes for collecting the historical samples corresponding to the historical data transmission and processes for performing the model training according to the historical samples to obtain the first prediction model are the same as those in the model training method described above, and thus are not repeated here.

According to the channel adjustment method provided in the present application, the probability value of the result of the CRC can be predicted based on the trained first prediction model, and the channel adjustment is performed based on the predicted probability value, and is not performed based on a latest result of the CRC, so that a better value of the second intermediate variable information corresponding to a next data transmission can be obtained, and a better MCS is further obtained, the real-time performance of the channel adjustment is improved, and the performance of the system is improved.

In some implementations, the second scheduling information and the second external environment information corresponding to the current data transmission are collected, and are input into the trained first prediction model to obtain the second information corresponding to the current data transmission, i.e., the channel state is more comprehensively reflected by the second scheduling information and the second external environment information, so that an accuracy of determining the channel quality is improved.

FIG. 3 is a flowchart of a channel adjustment method according to the present application.

In a third aspect, referring to FIG. 3, the present application provides a channel adjustment method, including following operations 300 to 302.

At operation 300, collecting second scheduling information corresponding to a current data transmission, with the second scheduling information including second intermediate variable information in an adaptive modulation and coding process.

In some implementations, the current data transmission refers to a transmission of data other than data conservatively scheduled and retransmitted.

In the present application, the second scheduling information is used to describe scheduling information affecting the channel quality during the current data transmission.

In the present application, the second intermediate variable information in the AMC process is variable information to be determined in a channel adjustment process.

In some implementations, the second intermediate variable information in the AMC process includes any one of followings: a second MCS corresponding to the current data transmission or a second SINR corresponding to the current data transmission.

In the present application, in response to that the SINR is used as the variable information to be determined in the channel adjustment process, an original AMC flow is not to be changed in the channel adjustment process: in response to that the MCS is used as the variable information to be determined in the channel adjustment process, the original AMC flow is to be changed in the channel adjustment process.

In some implementations, the second scheduling information further includes at least one of followings: second RB information for scheduling the current data transmission, or second slot information for scheduling the current data transmission.

In some implementations, the collecting second scheduling information corresponding to a current data transmission includes: collecting second scheduling information and second external environment information corresponding to the current data transmission.

In the present application, the second external environment information is used to describe external environment information affecting the channel quality during the current data transmission.

In some implementations, the second external environmental information includes at least one of followings: a second chip type of a receiving terminal of the current data transmission, a second path loss between a sending terminal and the receiving terminal of the current data transmission, second air interface measurement information between the sending terminal and the receiving terminal of the current data transmission, or a second power margin of the sending terminal of the current data transmission.

In the present application, the second air interface measurement information may be, for example, a transmission power of the sending terminal of the current data transmission, or inter-cell interference information during performing the current data transmission.

At operation 301, traversing all values of the second intermediate variable information, and inputting the second scheduling information into a trained first prediction model to obtain the second information corresponding to the current data transmission which corresponds to each value of the second intermediate variable information, with the second information representing a probability value of a result of cyclic redundancy check (CRC).

In the present application, the second information includes a probability value representing a success of the CRC or a probability value representing a failure of the CRC.

In some implementations, the inputting the second scheduling information into a trained first prediction model to obtain the second information corresponding to the current data transmission which corresponds to each value of the second intermediate variable information includes: inputting the second scheduling information and the second external environment information into the trained first prediction model to obtain the second information corresponding to the current data transmission which corresponds to each value of the second intermediate variable information.

At operation 302, selecting the value, corresponding to a difference with a minimum absolute value in differences between the second information corresponding to the current data transmission and a target value of a block error rate, from all the values of the second intermediate variable information.

In some implementations, the channel adjustment method further includes: before the collecting second scheduling information corresponding to the current data transmission, collecting historical samples corresponding to a historical data transmission, with the historical samples including first scheduling information and first information corresponding to the historical data transmission, the first information representing the result of the cyclic redundancy check, and the first scheduling information including first intermediate variable information in an adaptive modulation and coding process; and performing model training according to the historical samples to obtain a first prediction model, and during the model training, the first scheduling information is used as an input of the first prediction model, the first information is converted into second information corresponding to the historical data transmission to be used as an output of the first prediction model.

In the present application, specific processes for collecting the historical samples corresponding to the historical data transmission and processes for performing the model training according to the historical samples to obtain the first prediction model are the same as those in the model training method described above, and thus are not repeated here.

According to the channel adjustment method provided in the present application, the probability value of the result of the CRC can be predicted based on the trained first prediction model, and the channel adjustment is performed based on the predicted probability value, and is not performed based on a latest result of the CRC, so that a better value of the second intermediate variable information corresponding to a next data transmission can be obtained, and a better MCS is further obtained, the real-time performance of the channel adjustment is improved, and the performance of the system is improved.

In some implementations, the second scheduling information and the second external environment information corresponding to the current data transmission are collected, and are input into the trained first prediction model to obtain the second information corresponding to the current data transmission which corresponds to each value of the second intermediate variable information, i.e., the channel state is more comprehensively reflected by the second scheduling information and the second external environment information, so that an accuracy of determining the channel quality is improved.

Several specific examples are listed below to illustrate specific implementation procedures of the channel adjustment method according to the present application, and the examples are merely for conveniently illustrating and are not intended to limit the protection scope of the present application.

Example 1

In high-speed scenes, the channel state changes relatively fast, it is difficult to accurately predict the channel quality, and the AMC in the related art has poor performance.

This example, by taking the high-speed scenes as an example, describes an implementation in which a model training method in an offline stage and a channel adjustment method in an online stage are combined to determine a better MCS in real time for each user in the high-speed scene, as shown in FIG. 4, and the implementation includes following operations 400 to 411.

At operation 400, for an implementation of a cell-level scheme, collecting historical samples of all users in a cell within a period of continuous time.

The historical samples include: first scheduling information corresponding to a historical data transmission, first external environment information and first information related to a channel quality, with the first information representing a result of CRC.

The first scheduling information includes: the number of first RBs scheduling the historical data transmission, the number of first slots scheduling the historical data transmission, and a first SINR corresponding to the historical data transmission.

The first external environment information includes: a first path loss between a sending terminal and a receiving terminal of the historical data transmission, and a first power margin of the sending terminal of the historical data transmission.

For example, 298055 collected historical samples are as shown in following Table 2.

TABLE 2

| | number of first RBs | number of first slots | First path loss | First SINR | First power margin |
|---|---|---|---|---|---|
| 0 | 7 | 18 | 110.5 | 26.5 | 11 |
| 1 | 7 | 8 | 110.5 | 28.5 | 11 |
| 2 | 3 | 8 | 111 | 26.75 | 10 |
| 3 | 3 | 18 | 111 | 28.75 | 10 |
| 4 | 3 | 8 | 110.5 | 29.5 | 9 |
| . . . | . . . | . . . | . . . | . . . | . . . |
| 298051 | 3 | 9 | 123 | 7.25 | −1 |
| 298052 | 3 | 8 | 123 | 7.25 | −1 |
| 298053 | 5 | 19 | 123 | 7 | −1 |
| 298054 | 17 | 9 | 123 | 5.5 | −1 |
| 298055 | 3 | 8 | 123 | 11.75 | −1 |

At operation 401, filtering the historical samples to filter out the historical samples conservatively scheduled and retransmitted.

For example, as shown in following Table 3, after the historical samples conservatively scheduled and retransmitted are filtered out, 294354 valid historical samples are remained.

TABLE 3

| | number of first RBs | number of first slots | First path loss | First SINR | First power margin |
|---|---|---|---|---|---|
| 0 | 7 | 18 | 110.5 | 26.5 | 11 |
| 1 | 7 | 8 | 110.5 | 28.5 | 11 |
| 2 | 3 | 8 | 111 | 26.75 | 10 |
| 3 | 3 | 18 | 111 | 28.75 | 10 |
| 4 | 3 | 8 | 110.5 | 29.5 | 9 |
| . . . | . . . | . . . | . . . | . . . | . . . |
| 294350 | 3 | 9 | 123 | 7.25 | −1 |
| 294351 | 3 | 8 | 123 | 7.25 | −1 |
| 294352 | 5 | 19 | 123 | 7 | −1 |
| 294353 | 17 | 9 | 123 | 5.5 | −1 |
| 294354 | 3 | 8 | 123 | 11.75 | −1 |

At operation 402, according to a ratio of 8:2, dividing the filtered historical samples into two parts including a training set for training a model and a validation set for validating a predictive power of the model.

At operation 403, taking the first scheduling information and the first external environment information in the filtered historical samples in the training set as inputs of a second prediction model, converting the first information in the filtered historical samples in the training set into second information corresponding to the historical data transmission, taking the second information corresponding to the historical data transmission as an output of the second prediction model (i.e., taking a result of CRC as a classification label), and selecting a Gini coefficient as an objective function to train the second prediction model, with the second information representing a probability value of a failure of the CRC.

At operation 404, inputting the first scheduling information and the first external environment information in the filtered historical samples in the validation set into the trained second prediction model to obtain second information corresponding to the filtered historical samples.

At operation 405, grouping the validation set according to the second information corresponding to the filtered historical samples. For example, the filtered historical samples corresponding to the second information less than or equal to 7% are divided into a group 0; the filtered historical samples corresponding to the second information greater than 7%, and less than or equal to 13% are divided into a group 1: the filtered historical samples corresponding to the second information greater than 13% are divided into a group 2.

At operation 406, determining whether the group 0, the group 1 and the group 2 all meet a preset condition, and in response to that the group 0, the group 1 and the group 2 all meet the preset condition, executing operation 407: in response to that at least one of the group 0, the group 1 and the group 2 does not meet the preset condition, executing operation 400.

The group 0 meeting the preset condition indicates that an absolute value of a difference between a mean value of probability values corresponding to the group 0 and the second information, corresponding to the group 0, obtained by statistics is smaller than or equal to a first preset threshold: the group 1 meeting the preset condition indicates that an absolute value of a difference between a mean value of probability values corresponding to the group 1 and the second information, corresponding to the group 1, obtained by statistics is smaller than or equal to the first preset threshold; and the group 2 meeting the preset condition indicates that an absolute value of a difference between a mean value of probability values corresponding to the group 2 and the second information, corresponding to the group 2, obtained by statistics is smaller than or equal to the first preset threshold.

The mean value of the probability values corresponding to the group 0 is a mean value of the second information corresponding to all the filtered historical samples in the group 0: the mean value of the probability values corresponding to the group 1 is a mean value of the second information corresponding to all the filtered historical samples in the group 1: the mean value of the probability values corresponding to the group 2 is a mean value of the second information corresponding to all the filtered historical samples in the group 2.

The second information corresponding to the group 0 is a ratio of the number of the filtered historical samples with the first information representing the failure of the CRC in the group 0 to the number of all the filtered historical samples in the group 0: the second information corresponding to the group 1 is a ratio of the number of the filtered historical samples with the first information representing the failure of the CRC in the group 1 to the number of all the filtered historical samples in the group 1: the second information corresponding to the group 2 is a ratio of the number of the filtered historical samples with the first information representing the failure of the CRC in the group 2 to the number of all the filtered historical samples in the group 2.

Figure 5:
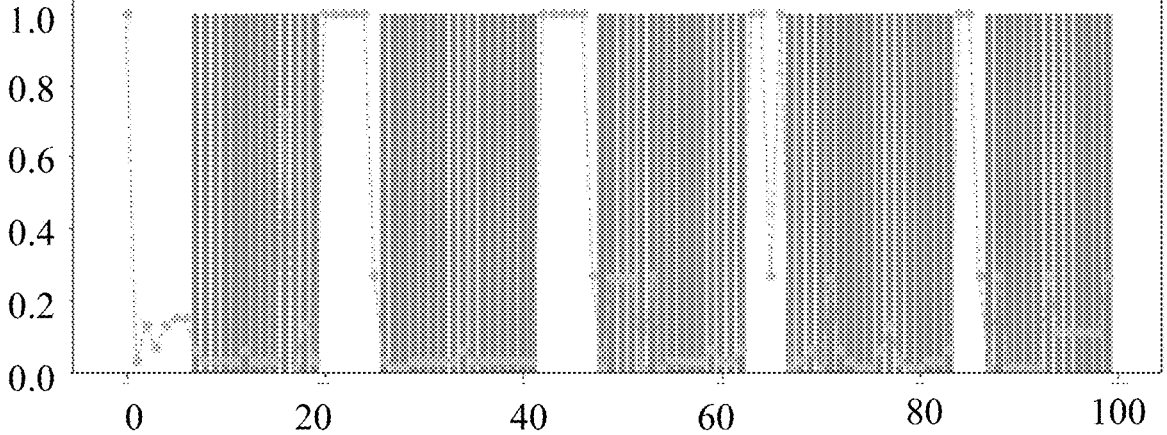
FIG. 5 is a schematic diagram illustrating a comparison between first information and second information corresponding to filtered historical samples in a validation set provided in Example 1 according to the present application.

As shown in FIG. 5, 100 historical samples being adopted is taken as an example to illustrate first information and second information corresponding to the filtered historical samples, in FIG. 5, a columnar indicates the first information, a filled position indicates the first information representing the success of the CRC, and a blank position indicates the first information representing the failure of the CRC: a dotted line indicates the second information, and it can be seen from FIG. 5 that the first prediction model accurately predicts the historical samples corresponding to the first information representing the failure of the CRC.

At operation 407, taking the second prediction model as the first prediction model, and outputting the first prediction model.

At operation 408, issuing the first prediction model to a network element side, and triggering an active prediction function of an original AMC flow.

At operation 409, setting a loop exit condition.

For example, the loop exit condition includes: a maximum number of adjustment times is equal to 50; a maximum accumulated adjustment amount is 3264/128 DB; or a probability value of the failure of the CRC is within a target BLER range, i.e., [7%, 13%].

At operation 410, in response to that the user in the high-speed scene accesses, triggering an active tracking for the second SINR by the cell deployed with the first prediction model, that is, based on the original AMC flow, circularly adjusting a control variable, i.e., the second SINR, of the AMC, and till the loop exit condition is met, exiting from an adjustment logic (i.e., logic of the adjusting), and outputs a value of the second SINR matched with a current channel state.

Specifically, the operation 410 may include following operations 41001 to 41011.

At operation 41001, collecting second scheduling information and second external environment information corresponding to the current data transmission.

The second scheduling information includes second RB information for scheduling the current data transmission, second slot information for scheduling the current data transmission, and a second SINR corresponding to the current data transmission.

The second external environment information includes a second chip type of a receiving terminal of the current data transmission, a second path loss between a sending terminal and the receiving terminal of the current data transmission, second air interface measurement information between the sending terminal and the receiving terminal of the current data transmission, and a second power margin of the sending terminal of the current data transmission.

At operation 41002, inputting the second scheduling information and the second external environment information into the trained first prediction model to obtain second information corresponding to the current data transmission, with the second information representing a probability value of the failure of the CRC.

At operation 41003, determining whether the second information corresponding to the current data transmission is within a range of [7%, 13%], and in response to that the second information is within the range of [7%, 13%], executing operation 41004: in response to that the second information is not within a range of [7%, 13%], executing operation 41005.

At operation 41004, outputting the second SINR as a value of SINR matching with the current channel state.

At operation 41005, determining whether the current number of adjustment times (i.e., the number of adjustments performed) is greater than or equal to 50: in response to that the number is greater than or equal to 50, executing operation 41004: in response to that the number is less than 50, executing operation 41006.

At operation 41006, determining whether an accumulated adjustment amount is greater than or equal to 3264/128 DB, in response to that the accumulated adjustment amount is greater than or equal to 3264/128 DB, executing operation 41004: in response to that the accumulated adjustment amount is less than 3264/128 DB, executing operation 41007.

At operation 41007, calculating to obtain a difference between the second information corresponding to the current data transmission and a target value of BLER.

At operation 41008, calculating the number of adjustment steps according to a formula $S=\Delta_b \times \alpha$; S is the number of the adjustment steps, $\Delta_b$ is the difference obtained by calculation, $\alpha$ is an adjustment sensitivity parameter.

At operation 41009, calculating an adjustment amount according to a formula $\Delta_{s1}=\Delta_{s2} \times S$, $\Delta_{s1}$ is the adjustment amount, $\Delta_{s2}$ is a length of each adjustment step (the length of the adjustment step is set to be 2/128 DB in this example), S is the number of the adjustment steps.

At operation 41010, adding the adjustment amount $\Delta_{s1}$ to the second SINR to obtain the adjusted second SINR.

At operation 41011, replacing the second SINR with the adjusted second SINR, and executing operation 41002.

At operation 411, entering a table look-up flow of the original AMC flow, and performing table look-up to obtain a better second MCS based on the value of the second SINR outputted at the previous operation.

Example 2

In an edge weak coverage scene, an accuracy of measuring the channel quality of a user therein is poor, thereby an accuracy of estimating the channel state is affected, and the AMC in the related art has poor performance.

This example, by taking the edge weak coverage scene as an example, describes a construction of a first prediction model, a deployment of the first prediction model, and an implementation of guiding an adjustment of a control parameter based on the first prediction model to finally determine a better MCS, as shown in FIG. 6, the implementation of the example includes following operations 600 to 605.

At operation 600, extracting historical samples of users in each cell of a system within a period of continuous time.

The historical samples include: first scheduling information corresponding to a historical data transmission, first external environment information and first information related to the channel quality, with the first information representing a result of CRC.

The first scheduling information includes: the number of first RBs for scheduling the historical data transmission, the number of first slots for scheduling the historical data transmission, and a first SINR corresponding to the historical data transmission.

The first external environment information includes: a first path loss between a sending terminal and a receiving terminal of the historical data transmission, and a first power margin of the sending terminal of the historical data transmission.

At operation 601, training a first prediction model corresponding to each cell according to the historical samples of the cell.

At operation 602, deploying each cell-level first prediction model at a network element side of a base station.

At operation 603, setting a loop exit condition to meet any one of followings: a maximum number of adjustment times is 50: a maximum accumulated adjustment amount is 3264/128 DB; or a probability value of the failure of the CRC is within an acceptable range [8%, 12%] of fluctuation of a target BLER.

At operation 604, in response to that the user accesses an edge area of the cell, performing service scheduling by the system, triggering an active tracking for the second SINR by the cell deployed with the first prediction model, that is, based on the original AMC flow, circularly adjusting a control variable, i.e., the second SINR, of the AMC, and till the condition set in operation 603 is met, exiting from an adjustment logic (i.e., logic of the adjusting), and outputs a value of the second SINR matched with a current channel state.

At operation 605, entering a table look-up flow of the original AMC flow, and performing table look-up to obtain a better second MCS based on the value of the second SINR outputted at the previous operation.

Example 3

In a discontinuous interference scene, an interference suffered by a user is discontinuous, a fluctuation of the MCS has randomness, and the AMC in the related art has poor performance. This example, by taking the discontinuous interference scene as an example, describes a construction of a first prediction model, a deployment of the first prediction model, and a strategy of selecting a better MCS of guiding an adjustment of a control parameter based on the first prediction model, as shown in FIG. 7, the implementation of this example includes following operations 700 to 711.

At operation 700, for an implementation of a cell-level scheme, collecting historical samples of all users in a cell within a period of continuous time.

The historical samples include: first scheduling information corresponding to a historical data transmission, first external environment information and first information related to the channel quality, with the first information representing a result of CRC.

The first scheduling information includes: the number of first RBs for scheduling the historical data transmission, the number of first slots for scheduling the historical data transmission, and a first SINR corresponding to the historical data transmission.

The first external environment information includes: a first path loss between a sending terminal and a receiving terminal of the historical data transmission, and a first power margin of the sending terminal of the historical data transmission.

At operation 701, filtering the historical samples to filter out the historical samples conservatively scheduled and retransmitted.

At operation 702, according to a ratio of 7:3, dividing the filtered historical samples into two parts including a training set for training a model and a validation set for validating a predictive power of the model.

At operation 703, taking the first scheduling information and the first external environment information in the filtered historical samples in the training set as inputs of a second prediction model, converting the first information in the filtered historical samples in the training set into second information corresponding to the historical data transmission, taking the second information corresponding to the historical data transmission as an output of the second prediction model (i.e., taking a result of CRC as a classification label), and selecting a Gini coefficient as an objective function to train the second prediction model, the second information is used for representing a probability value of a failure of the CRC.

At operation 704, inputting the first scheduling information and the first external environment information in the filtered historical samples in the validation set into the trained second prediction model to obtain second information corresponding to the filtered historical samples.

At operation 705, grouping the validation set according to the second information corresponding to the filtered historical samples. For example, the filtered historical samples corresponding to the second information less than or equal to 7% are divided into a group 0: the filtered historical samples corresponding to the second information greater than 7%, and less than or equal to 13% are divided into a group 1: the filtered historical samples corresponding to the second information greater than 13% are divided into a group 2.

At operation 706, determining whether the group 0, the group 1 and the group 2 all meet a preset condition, and in response to that the group 0, the group 1 and the group 2 all meet the preset condition, executing operation 707: in response to that at least one of the group 0, the group 1 and the group 2 does not meet the preset condition, executing operation 700.

The group 0 meeting the preset condition indicates that an absolute value of a difference between a mean value of probability values corresponding to the group 0 and the second information, corresponding to the group 0, obtained by statistics is smaller than or equal to a first preset threshold: the group 1 meeting the preset condition indicates that an absolute value of a difference between a mean value of probability values corresponding to the group 1 and the second information, corresponding to the group 1, obtained by statistics is smaller than or equal to the first preset threshold; and the group 2 meeting the preset condition indicates that an absolute value of a difference between a mean value of probability values corresponding to the group 2 and the second information, corresponding to the group 2, obtained by statistics is smaller than or equal to the first preset threshold.

The mean value of the probability values corresponding to the group 0 is a mean value of the second information corresponding to all the filtered historical samples in the group 0; the mean value of the probability values corresponding to the group 1 is a mean value of the second information corresponding to all the filtered historical samples in the group 1: the mean value of the probability values corresponding to the group 2 is a mean value of the second information corresponding to all the filtered historical samples in the group 2.

The second information corresponding to the group 0 is a ratio of the number of the filtered historical samples with the first information representing the failure of the CRC in the group 0 to the number of all the filtered historical samples in the group 0: the second information corresponding to the group 1 is a ratio of the number of the filtered historical samples with the first information representing the failure of the CRC in the group 1 to the number of all the filtered historical samples in the group 1: the second information corresponding to the group 2 is a ratio of the number of the filtered historical samples with the first information representing the failure of the CRC in the group 2 to the number of all the filtered historical samples in the group 2.

At operation 707, taking the second prediction model as the first prediction model, and outputting the first prediction model.

At operation 708, issuing the first prediction model to a network element side, and triggering an active prediction function of an original AMC flow.

At operation 709, setting a loop exit condition.

The loop exit condition includes: a maximum number of adjustment times is 100; a maximum accumulated adjustment amount is 3264/128 DB; or a probability value of the failure of the CRC is within a target BLER range, i.e., [8%, 12%].

At operation 710, in response to that a user accesses in the discontinuous interference scene, triggering an active tracking for the second SINR by the cell deployed with the first prediction model, that is, based on the original AMC flow, circularly adjusting a control variable, i.e., the second SINR, of the AMC, and till the loop exit condition is met, exiting from an adjustment logic (i.e., logic of the adjusting), and outputs a value of the second SINR matched with a current channel state.

At operation 711, entering a table look-up flow of the original AMC flow, and performing table look-up to obtain a better second MCS based on the value of the second SINR outputted at the previous operation.

Example 4

Measurement interferences of different types of chips may change along with a power in inconsistent or different rules, the channel state at different scheduling moments are related to the chip types, and the AMC in the related art does not consider a scene of complex types of terminal chips.

The present example, by taking the scene of complex types of terminal chips as an example, describes a construction of a first prediction model, a deployment of the first prediction model, and a strategy of selecting a better MCS of guiding an adjustment of a control parameter based on the first prediction model, as shown in FIG. 8, the implementation of the example includes following operations 800 to 811.

At operation 800, for an implementation of a cell-level scheme, collecting historical samples of all users in a cell within a period of continuous time.

The historical samples include: first scheduling information corresponding to a historical data transmission, first external environment information and first information related to the channel quality, with the first information representing a result of CRC The first scheduling information includes: the number of first RBs for scheduling the historical data transmission, the number of first slots for scheduling the historical data transmission, and a first SINR corresponding to the historical data transmission.

The first external environment information includes: a first path loss between a sending terminal and a receiving terminal of the historical data transmission, and a first power margin of the sending terminal of the historical data transmission.

At operation 801, filtering the historical samples to filter out the historical sample conservatively scheduled and retransmitted.

At operation 802, according to a ratio of 8:2, dividing the filtered historical samples into two parts including a training set for training a model and a validation set for validating a predictive power of the model.

At operation 803, taking the first scheduling information and the first external environment information in the filtered historical samples in the training set as inputs of a second prediction model, converting the first information in the filtered historical samples in the training set into second information corresponding to the historical data transmission, taking the second information corresponding to the historical data transmission as an output of the second prediction model (i.e., taking a result of CRC as a classification label), and selecting a Gini coefficient as an objective function to train the second prediction model, the second information is used for representing a probability value of a failure of the CRC.

At operation 804, inputting the first scheduling information and the first external environment information in the filtered historical samples in the validation set into the trained second prediction model to obtain second information corresponding to the filtered historical samples.

At operation 805, grouping the validation set according to the second information corresponding to the filtered historical samples. For example, the filtered historical samples corresponding to the second information less than or equal to 7% are divided into a group 0: the filtered historical samples corresponding to the second information greater than 7%, and less than or equal to 13% are divided into a group 1: the filtered historical samples corresponding to the second information greater than 13% are divided into a group 2.

At operation 806, determining whether the group 0, the group 1 and the group 2 all meet a preset condition, and in response to that the group 0, the group 1 and the group 2 all meet the preset condition, executing operation 807: in response to that at least one of the group 0, the group 1 and the group 2 does not meet the preset condition, executing operation 800.

The group 0 meeting the preset condition indicates that an absolute value of a difference between a mean value of probability values corresponding to the group 0 and the second information, corresponding to the group 0, obtained by statistics is smaller than or equal to a first preset threshold: the group 1 meeting the preset condition indicates that an absolute value of a difference between a mean value of probability values corresponding to the group 1 and the second information, corresponding to the group 1, obtained by statistics is smaller than or equal to the first preset threshold; and the group 2 meeting the preset condition indicates that an absolute value of a difference between a mean value of probability values corresponding to the group 2 and the second information, corresponding to the group 2, obtained by statistics is smaller than or equal to the first preset threshold.

The mean value of the probability values corresponding to the group 0 is a mean value of the second information corresponding to all the filtered historical samples in the group 0: the mean value of the probability values corresponding to the group 1 is a mean value of the second information corresponding to all the filtered historical samples in the group 1: the mean value of the probability values corresponding to the group 2 is a mean value of the second information corresponding to all the filtered historical samples in the group 2.

The second information corresponding to the group 0 is a ratio of the number of the filtered historical samples with the first information representing the failure of the CRC in the group 0 to the number of all the filtered historical samples in the group 0: the second information corresponding to the group 1 is a ratio of the number of the filtered historical samples with the first information representing the failure of the CRC in the group 1 to the number of all the filtered historical samples in the group 1: the second information corresponding to the group 2 is a ratio of the number of the filtered historical samples with the first information representing the failure of the CRC in the group 2 to the number of all the filtered historical samples in the group 2.

At operation 807, taking the second prediction model as the first prediction model, and outputting the first prediction model.

At operation 808, issuing the first prediction model to a network element side, and triggering an active prediction function of an original AMC flow.

At operation 809, setting a loop exit condition.

The loop exit condition includes: a maximum number of adjustment times is 150; a maximum accumulated adjustment amount is 3264/128 DB; or a probability value of the failure of the CRC is within a target BLER range, i.e., [6%, 14%].

At operation 810, in response to that a user accesses the scene of complex types of terminal chips, triggering an active tracking for the second SINR by the cell deployed with the first prediction model, that is, based on the original AMC flow, circularly adjusting a control variable, i.e., the second SINR, of the AMC, and till the loop exit condition is met, exiting from an adjustment logic (i.e., logic of the adjusting), and outputs a value of the second SINR matched with a current channel state.

At operation 811, entering a table look-up flow of the original AMC flow, and performing table look-up to obtain a better second MCS based on the value of the second SINR outputted at the previous operation.

In a fourth aspect, the present application provides an electronic device, including: at least one processor; and a memory having at least one computer program stored thereon, the at least one computer program, executed by the at least one processor, causes the at least one processor to implement the model training method described above, or the channel adjustment method described above.

The processor is a device having a capability of processing data, includes, but is not limited to, a Central Processing Unit (CPU), and the like: the memory is a device having a capability of storing data, includes, but is not limited to, a random access memory (RAM, in particular, SDRAM, DDR, and the like), a read only memory (ROM), an electrically erasable programmable read only memory (EE-PROM), and a FLASH.

In some implementations, the processor, and the memory are connected together through a bus, and are further connected to other components of a computing device.

In a fifth aspect, the present application provides a computer-readable storage medium having a computer program stored thereon, the computer program, executed by a processor, causes the processor to implement the model training method described above, or the channel adjustment method described above.

Figure 9:
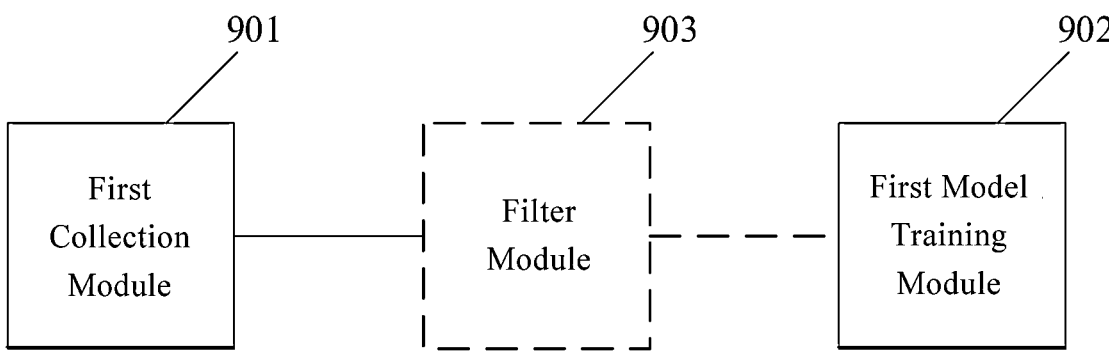
FIG. 9 is block diagram illustrating a composition of a model training apparatus according to the present application.

FIG. 9 is block diagram illustrating a model training apparatus according to the present application.

In a sixth aspect, referring to FIG. 9, the present application provides a model training apparatus, including a first collection module 901 and a first model training module 902.

The first collection module 901 is configured to collect historical samples: the historical samples include first scheduling information and first information corresponding to a historical data transmission, and the first information is used for representing a result of cyclic redundancy check (CRC): the first scheduling information includes first intermediate variable information in an adaptive modulation and coding process.

The first model training module 902 is configured to perform model training according to the historical samples to obtain a first prediction model: during the model training, the first scheduling information is used as an input of the first prediction model, the first information is converted into second information corresponding to the historical data transmission to be used as an output of the first prediction model; and the second information is used for representing a probability value of the result of the cyclic redundancy check.

In some implementations, the model training apparatus further includes: a filter module 903.

The filter module 903 is configured to filter the historical samples.

Correspondingly, the first model training module 902 is configured to perform model training according to the filtered historical samples to obtain the first prediction model.

In some implementations, the first model training module 902 is configured to divide the historical samples into a training set and a validation set: perform model training according to the training set to obtain a second prediction model: perform a validation on the second prediction model by adopting the validation set; and in response to that the validation is successful, take the second prediction model as the first prediction model.

In some implementations, the first model training module 902 is further configured to, in response to that the validation for the second prediction model is failure, continue to execute the collecting historical samples until the validation is successful.

In some implementations, the first model training module 902 is configured to adopt following manners to perform the validation on the second prediction model by adopting the validation set: inputting the first scheduling information in each historical sample in the validation set into the second prediction model to obtain the second information corresponding to the historical sample: grouping the validation set according to the second information corresponding to the historical samples: in response to that all groups meet a preset condition, the validation is successful; and in response to that at least one group does not meet the preset condition, the validation is failure: any group meeting the preset condition includes: an absolute value of a difference between a mean value of probability values corresponding to the group and the second information, corresponding to the group, obtained statistically is less than or equal to a first preset threshold: the mean value of the probability values corresponding to the group is a mean value of the second information corresponding to all the historical samples in the group; and the second information corresponding to the group is statistically obtained according to the first information in all the historical samples in the group.

In some implementations, the first model training module 902 is configured to perform cluster analysis on the historical samples to obtain M categories, with M being an integer greater than or equal to 1, and for each category, calculate the second information corresponding to the category according to the first information in the historical samples in the category.

In some implementations, the historical samples include first external environment information: correspondingly, the first scheduling information and the first external environment information are used as inputs of the first prediction model during the model training.

In some implementations, the first external environment information includes at least one of: a first chip type of a receiving terminal of the historical data transmission, a first path loss between a sending terminal and the receiving terminal of the historical data transmission, first air interface measurement information between the sending terminal and the receiving terminal of the historical data transmission, or a first power margin of the sending terminal of the historical data transmission.

In some implementations, the first scheduling information further includes at least one of: first resource block information for scheduling the historical data transmission, or first slot information for scheduling the historical data transmission.

In some implementations, the first intermediate variable information in the adaptive modulation and coding process includes any one of: a first modulation and coding scheme (MCS) corresponding to the historical data transmission, or a first signal to interference plus noise ratio (SINR) corresponding to the historical data transmission.

A procedure for implementing the model training apparatus described above is the same as that for implementing the model training method described above, and thus is not repeated herein.

Figure 10:
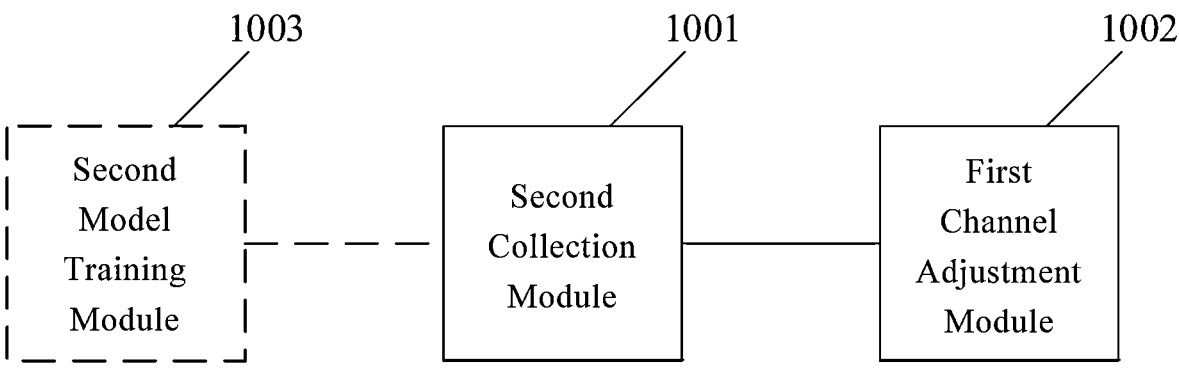
FIG. 10 is block diagram illustrating a composition of a channel adjustment apparatus according to the present application.

FIG. 10 is block diagram illustrating a channel adjustment apparatus according to the present application.

In a seventh aspect, referring to FIG. 10, the present application provides a channel adjustment apparatus, including a second collection module 1001 and a first channel adjustment module 1002.

The second collection module 1001 is configured to collect second scheduling information corresponding to a current data transmission: the second scheduling information includes second intermediate variable information in an adaptive modulation and coding process.

The first channel adjustment module 1002 is configured to input the second scheduling information into a trained first prediction model to obtain second information corresponding to the current data transmission, with the second information representing a probability value of a result of cyclic redundancy check; and in response to that the second information corresponding to the current data transmission is greater than or equal to a first threshold, and is less than or equal to a second threshold, output the second intermediate variable information.

In some implementations, the first channel adjustment module 1002 is further configured to, in response to that the second information corresponding to the current data transmission is less than the first threshold, or greater than the second threshold, adjust the second intermediate variable information according to the second information corresponding to the current data transmission; and replace the second intermediate variable information with the adjusted second intermediate variable information, and continue to execute the inputting the second scheduling information into the trained first prediction model to obtain second information corresponding to the current data transmission until a loop exit condition is met: the loop exit condition being met includes any one of: the number of adjustment times is greater than or equal to the preset maximum number of adjustment times: the second information corresponding to the current data transmission is greater than or equal to the first threshold and less than or equal to the second threshold; or an accumulated adjustment amount is greater than or equal to a preset maximum accumulated adjustment amount: the accumulated adjustment amount is a sum of adjustment amounts corresponding to previous N adjustments, N is the current number of the adjustment times (i.e., the number of adjustments performed), and an adjustment amount corresponding to each adjustment is a difference between the adjusted second intermediate variable information corresponding to the adjustment and the second intermediate variable information before the adjustment.

In some implementations, the first channel adjustment module 1002 is configured to adjust the second intermediate variable information according to the second information corresponding to the current data transmission in following manners: calculating to obtain a difference between the second information corresponding to the current data transmission and a target value of a block error rate; determining the number of adjustment steps according to the difference; determining an adjustment amount according to the number of the adjustment steps; and adding the adjustment amount to the second intermediate variable information to obtain the adjusted second intermediate variable information.

In some implementations, the second collection module 1001 is configured to collect the second scheduling information and second external environment information corresponding to the current data transmission: correspondingly, the first channel adjustment module 1002 is configured to input the second scheduling information into the trained first prediction model to obtain the second information corresponding to the current data transmission in following manners: inputting the second scheduling information and the second external environment information into the trained first prediction model to obtain the second information corresponding to the current data transmission.

In some implementations, the second external environment information includes at least one of: a second chip type of a receiving terminal of the current data transmission, a second path loss between a sending terminal and the receiving terminal of the current data transmission, second air interface measurement information between the sending terminal and the receiving terminal of the current data transmission, or a second power margin of the sending terminal of the current data transmission.

In some implementations, the second scheduling information further includes at least one of: second resource block information for scheduling the current data transmission, or second slot information for scheduling the current data transmission.

In some implementations, the channel adjustment apparatus further includes a second model training module 1003 configured to, before collecting the second scheduling information corresponding to the current data transmission, collect historical samples, with the historical samples including first scheduling information and first information corresponding to a historical data transmission, the first information representing the result of the cyclic redundancy check, and the first scheduling information including first intermediate variable information in an adaptive modulation and coding process; and perform model training according to the historical samples to obtain a first prediction model, and during the model training, the first scheduling information is used as an input of the first prediction model, the first information is converted into second information corresponding to the historical data transmission to be used as an output of the first prediction model.

A procedure for implementing the channel adjustment apparatus described above is the same as that for implementing the channel adjustment method described above, and thus is not repeated herein.

Figure 11:
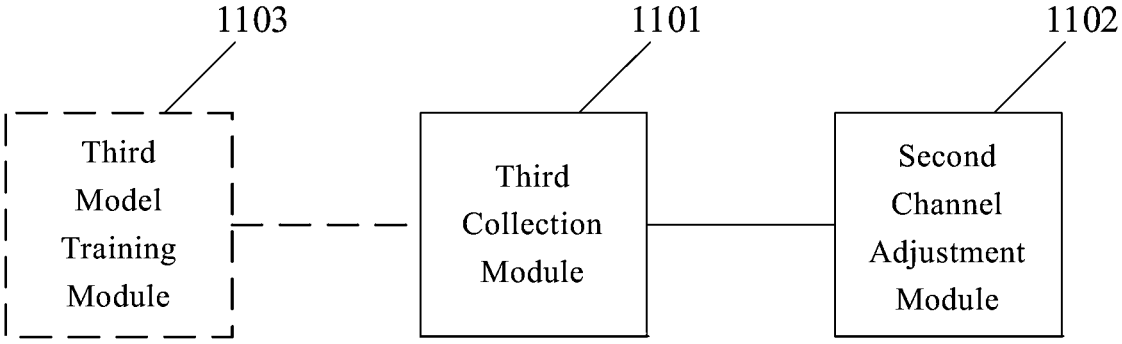
FIG. 11 is block diagram illustrating a composition of a channel adjustment apparatus according to the present application.

FIG. 11 is block diagram illustrating a channel adjustment apparatus according to the present application.

In an eighth aspect, referring to FIG. 11, the present application provides a channel adjustment apparatus, including a third collection module 1101 and a second channel adjustment module 1102.

The third collection module 1101 is configured to collect second scheduling information corresponding to a current data transmission: the second scheduling information includes second intermediate variable information in an adaptive modulation and coding process.

The second channel adjustment module 1102 is configured to traverse all values of the second intermediate variable information, and input the second scheduling information into a trained first prediction model to obtain the second information corresponding to the current data transmission which corresponds to each value of the second intermediate variable information, with the second information representing a probability value of a result of cyclic redundancy check.

In some implementations, the channel adjustment apparatus further includes a third model training module 1103 configured to select the value, corresponding to a difference with a minimum absolute value in differences between the second information corresponding to the current data transmission and a target value of a block error rate, from all the values of the second intermediate variable information.

A procedure for implementing the channel adjustment apparatus described above is the same as that for implementing the channel adjustment method described above, and thus is not repeated herein.

It should be understood by those of ordinary skill in the art that all or some of the operations in the method, the functional modules/components in the apparatuses disclosed above may be implemented as software, firmware, hardware, or suitable combinations thereof. In a hardware implementation, the division between the functional modules/ components stated above does not correspond to the division of physical components: for example, one physical component may have a plurality of functions, or one function or operation may be performed through a cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/ non-removable medium implemented in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present application discloses the exemplary implementations, and although specific terms are employed, they are used and should only be interpreted in a generic and descriptive meaning but not for purposes of a limitation. It is apparent to those skilled in the art that features, characteristics and/or elements described in connection with specific implementations may be used alone or in combination with features, characteristics and/or elements described in connection with other implementations, unless explicitly stated otherwise. Therefore, it should be understood by those skilled in the art that various changes in form and details may be made without departing from the scope of the present application as set forth in the appended claims.

What is claimed is:

1. A model training method, comprising:

collecting historical samples, with the historical samples comprising first scheduling information and first information corresponding to a historical data transmission, the first information representing a result of cyclic redundancy check, and the first scheduling information comprising first intermediate variable information in an adaptive modulation and coding process; and performing model training according to the historical samples to obtain a first prediction model, wherein during the model training, the first scheduling information is used as an input of the first prediction model, the first information is converted into second information corresponding to the historical data transmission to be used as an output of the first prediction model, and the second information is used for representing a probability value of the result of the cyclic redundancy check.

2. The method of claim 1, further comprising:

after the collecting historical samples and before the performing model training according to the historical samples to obtain a first prediction model, filtering the historical samples;

the performing model training according to the historical samples to obtain a first prediction model comprises: performing the model training according to the filtered historical samples to obtain the first prediction model.

3. The method of claim 1, wherein the performing model training according to the historical samples to obtain a first prediction model comprises:

dividing the historical samples into a training set and a validation set;

performing the model training according to the training set to obtain a second prediction model;

performing a validation on the second prediction model by adopting the validation set; and in response to that the validation is successful, taking the second prediction model as the first prediction model.

4. The method of claim 3, wherein the performing model training according to the historical samples to obtain a first prediction model comprises:

in response to that the validation for the second prediction model is failure, continuing to execute the collecting historical samples until the validation is successful.

5. The method of claim 3, wherein the performing a validation on the second prediction model by adopting the validation set comprises:

inputting the first scheduling information in each historical sample in the validation set into the second prediction model to obtain the second information corresponding to the historical sample;

grouping the validation set according to the second information corresponding to the historical samples;

in response to that all groups meet a preset condition, the validation is successful; and in response to that at least one group does not meet the preset condition, the validation is failure, wherein any group meeting the preset condition comprises: an absolute value of a difference between a mean value of probability values corresponding to the group and the second information, corresponding to the group, obtained statistically is less than or equal to a first preset threshold, wherein the mean value of the probability values corresponding to the group is a mean value of the second information corresponding to all the historical samples in the group; and the second information corresponding to the group is statistically obtained according to the first information in all the historical samples in the group.

6. The method of claim 1, wherein the performing model training according to the historical samples to obtain a first prediction model comprises:

performing cluster analysis on the historical samples to obtain M categories, with M being an integer greater than or equal to 1; and for each category, calculating the second information corresponding to the category according to the first information in the historical samples in the category.

7. The method of claim 1, wherein the historical samples further comprise: first external environment information; the first scheduling information and the first external environment information are used as inputs of the first prediction model during the model training.

8. The method of claim 7, wherein the first external environment information comprises at least one of: a first chip type of a receiving terminal of the historical data transmission, a first path loss between a sending terminal and the receiving terminal of the historical data transmission, first air interface measurement information between the sending terminal and the receiving terminal of the historical data transmission, or a first power margin of the sending terminal of the historical data transmission.

9. The method of claim 1, wherein the first scheduling information further comprises at least one of: first resource block information for scheduling the historical data transmission, or first slot information for scheduling the historical data transmission.

10. The method of claim 1, wherein the first intermediate variable information in the adaptive modulation and coding process comprises any one of: a first modulation and coding scheme corresponding to the historical data transmission, or a first signal to interference plus noise ratio corresponding to the historical data transmission.

11. A channel adjustment method, comprising:
collecting historical samples, with the historical samples comprising first scheduling information and first information corresponding to a historical data transmission, the first information representing the result of the cyclic redundancy check, and the first scheduling information comprising first intermediate variable information in an adaptive modulation and coding process;
performing model training on a first prediction model according to the historical samples to obtain a trained first prediction model, wherein during the model training, the first scheduling information is used as an input of the first prediction model, the first information is converted into second information corresponding to the historical data transmission to be used as an output of the first prediction model;
collecting second scheduling information corresponding to a current data transmission, with the second scheduling information comprising second intermediate variable information in an adaptive modulation and coding process;
inputting the second scheduling information into the trained first prediction model to obtain second information corresponding to the current data transmission, with the second information representing a probability value of a result of cyclic redundancy check;
in response to that the second information corresponding to the current data transmission is less than a first threshold, or greater than a second threshold, adjusting the second intermediate variable information according to the second information corresponding to the current data transmission to obtain adjusted second intermediate variable information; and
replacing the second intermediate variable information with the adjusted second intermediate variable information, and continuing to execute the inputting the second scheduling information into a trained first prediction model to obtain second information corresponding to the current data transmission until a loop exit condition is met,
wherein the loop exit condition being met comprises any one of:
a total number of adjustment times is greater than or equal to a preset maximum number of the adjustment times;
the second information corresponding to the current data transmission is greater than or equal to the first threshold and less than or equal to the second threshold; or
an accumulated adjustment amount is greater than or equal to a preset maximum accumulated adjustment amount, with the accumulated adjustment amount being a sum of adjustment amounts corresponding to previous N adjustments, N being a current number of the adjustment times, and an adjustment amount corresponding to each adjustment being a difference between the adjusted second intermediate variable information corresponding to the adjustment and the second intermediate variable information before the adjustment,
wherein the first threshold is less than the second threshold.

12. The method of claim 11, wherein the adjusting the second intermediate variable information according to the second information corresponding to the current data transmission comprises:
calculating to obtain a difference between the second information corresponding to the current data transmission and a target value of a block error rate;
determining a total number of adjustment steps according to the difference;
determining an adjustment amount according to the number of the adjustment steps; and
adding the adjustment amount to the second intermediate variable information to obtain the adjusted second intermediate variable information.

13. The method of claim 11, wherein the collecting second scheduling information corresponding to a current data transmission comprises: collecting the second scheduling information and second external environment information corresponding to the current data transmission;
the inputting the second scheduling information into a trained first prediction model to obtain second information corresponding to the current data transmission comprises: inputting the second scheduling information and the second external environment information into the trained first prediction model to obtain the second information corresponding to the current data transmission.

14. The method of claim 13, wherein the second external environment information comprises at least one of: a second chip type of a receiving terminal of the current data transmission, a second path loss between a sending terminal and the receiving terminal of the current data transmission, second air interface measurement information between the sending terminal and the receiving terminal of the current data transmission, or a second power margin of the sending terminal of the current data transmission.

15. The method of claim 11, wherein the second scheduling information further comprises at least one of: second resource block information for scheduling the current data transmission, or second slot information for scheduling the current data transmission.

16. A channel adjustment method, comprising:
collecting historical samples, with the historical samples comprising first scheduling information and first information corresponding to a historical data transmission, the first information representing the result of the cyclic redundancy check, and the first scheduling information comprising first intermediate variable information in an adaptive modulation and coding process;

performing model training on a first prediction model according to the historical samples to obtain a trained first prediction model, wherein during the model training, the first scheduling information is used as an input of the first prediction model, the first information is converted into second information corresponding to the historical data transmission to be used as an output of the first prediction model;

collecting second scheduling information corresponding to a current data transmission, with the second scheduling information comprising second intermediate variable information in an adaptive modulation and coding process;

traversing all values of the second intermediate variable information, and inputting the second scheduling information into the trained first prediction model to obtain the second information corresponding to the current data transmission which corresponds to each value of the second intermediate variable information, with the second information representing a probability value of a result of cyclic redundancy check; and selecting the value, corresponding to a difference with a minimum absolute value in differences between the second information corresponding to the current data transmission and a target value of a block error rate, from all the values of the second intermediate variable information.

17. An electronic device, comprising:
at least one processor; and
a memory having at least one computer program stored thereon, the at least one computer program, executed by the at least one processor, causes the at least one processor to implement the model training method of claim 1.

18. A computer readable non-transitory storage medium, having a computer program stored thereon, the computer program, executed by a processor, causes the processor to implement the model training method of claim 1.

19. An electronic device, comprising:
at least one processor; and
a memory having at least one computer program stored thereon, the at least one computer program, executed by the at least one processor, causes the at least one processor to implement the model training method of claim 11.

20. An electronic device, comprising:
at least one processor; and
a memory having at least one computer program stored thereon, the at least one computer program, executed by the at least one processor, causes the at least one processor to implement the model training method of claim 16.

* * * * *